(12) United States Patent
Roev et al.

(10) Patent No.: US 12,334,562 B2
(45) Date of Patent: Jun. 17, 2025

(54) LITHIUM BATTERY AND METHOD OF PREPARING THE SAME

(71) Applicant: SAMSUNG ELECTRONICS CO., LTD., Suwon-si (KR)

(72) Inventors: Victor Roev, Hwaseong-si (KR); Jusik Kim, Hwaseong-si (KR); Myungjin Lee, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 613 days.

(21) Appl. No.: 17/563,147

(22) Filed: Dec. 28, 2021

(65) Prior Publication Data

US 2022/0336817 A1    Oct. 20, 2022

(30) Foreign Application Priority Data

Apr. 20, 2021 (KR) .................. 10-2021-0051354

(51) Int. Cl.
*H01M 4/62* (2006.01)
*C01B 32/174* (2017.01)
(Continued)

(52) U.S. Cl.
CPC .......... *H01M 4/628* (2013.01); *C01B 32/174* (2017.08); *C01B 32/194* (2017.08); *C01B 32/21* (2017.08); *C09C 1/56* (2013.01); *H01M 4/134* (2013.01); *H01M 4/366* (2013.01); *H01M 4/382* (2013.01); *H01M 4/405* (2013.01); *H01M 10/0525* (2013.01); *H01M 10/0585* (2013.01);
(Continued)

(58) Field of Classification Search
CPC ........ H01M 4/366; H01M 4/583; H01M 4/62; H01M 4/382
See application file for complete search history.

(56) References Cited

U.S. PATENT DOCUMENTS

| 6,083,645 A | 7/2000 | Takeuchi et al. |
| 9,281,521 B2 | 3/2016 | Zheng et al. |
| (Continued) | | |

FOREIGN PATENT DOCUMENTS

| CN | 108736056 A | * 11/2018 | .......... H01M 10/052 |
| CN | 111276675 A | *  6/2020 | ........ H01M 10/0525 |
| (Continued) | | | |

OTHER PUBLICATIONS

Risal et al., Silver-carbon interlayers in anode-free solid-state lithium metal batteries: Current development, interfacial issues, and instability challenges, Carbon, 213 118225 (2023) (Year: 2023).*
(Continued)

*Primary Examiner* — Amanda C. Walke
(74) *Attorney, Agent, or Firm* — CANTOR COLBURN LLP

(57) ABSTRACT

A lithium battery including a cathode, an anode, a liquid-impermeable ion-conductive membrane between the cathode and the anode, and an interlayer including a metal-carbon composite between the anode and the liquid-impermeable ion-conductive membrane, wherein the metal-carbon composite includes a carbonaceous material, a metal chemically bonded to the carbonaceous material, and a metal sulfide, a metal fluoride, or a combination thereof chemically bonded to the carbonaceous material.

29 Claims, 19 Drawing Sheets

(51) Int. Cl.
*C01B 32/194* (2017.01)
*C01B 32/21* (2017.01)
*C09C 1/56* (2006.01)
*H01M 4/134* (2010.01)
*H01M 4/36* (2006.01)
*H01M 4/38* (2006.01)
*H01M 4/40* (2006.01)
*H01M 10/0525* (2010.01)
*H01M 10/0585* (2010.01)
*H01M 4/02* (2006.01)

(52) U.S. Cl.
CPC ...... *C01P 2002/72* (2013.01); *C01P 2002/85* (2013.01); *C01P 2004/03* (2013.01); *C01P 2004/04* (2013.01); *C01P 2004/62* (2013.01); *C01P 2004/64* (2013.01); *C01P 2006/40* (2013.01); *H01M 2004/021* (2013.01); *H01M 2004/027* (2013.01)

(56) References Cited

U.S. PATENT DOCUMENTS

| | | | |
|---|---|---|---|
| 10,559,848 | B2 | 2/2020 | Takami et al. |
| 10,658,642 | B2* | 5/2020 | Zhamu ............... H01M 4/0421 |
| 10,658,669 | B2* | 5/2020 | Zhamu ............... H01M 4/0426 |
| 10,854,877 | B2 | 12/2020 | Ito et al. |
| 11,414,749 | B1* | 8/2022 | Kang ..................... C23C 16/32 |
| 11,777,076 | B2* | 10/2023 | Kim .................... H01M 4/0407 |
| | | | 429/304 |
| 2012/0100426 | A1 | 4/2012 | Kim et al. |
| 2012/0121973 | A1 | 5/2012 | Seo et al. |
| 2014/0170525 | A1 | 6/2014 | Hong et al. |
| 2015/0079485 | A1 | 3/2015 | Choi et al. |
| 2016/0181585 | A1 | 6/2016 | Choi et al. |
| 2017/0093002 | A1 | 3/2017 | Choi et al. |
| 2018/0040904 | A1 | 2/2018 | Choi et al. |
| 2018/0294513 | A1* | 10/2018 | Hwang ................ H01M 4/134 |
| 2019/0157723 | A1 | 5/2019 | Suzuki et al. |
| 2019/0393496 | A1* | 12/2019 | He ........................ H01M 4/133 |
| 2019/0393543 | A1* | 12/2019 | Zhamu ................ H01M 50/494 |
| 2020/0028178 | A1* | 1/2020 | He ......................... H01M 10/36 |
| 2021/0126258 | A1* | 4/2021 | Bell ..................... H01M 4/0435 |
| 2021/0210791 | A1 | 7/2021 | Suzuki et al. |
| 2021/0280853 | A1* | 9/2021 | Kim ..................... H01M 4/1395 |
| 2022/0045354 | A1* | 2/2022 | Kim ................... H01M 10/0562 |
| 2022/0115640 | A1 | 4/2022 | Sugimoto et al. |
| 2022/0226817 | A1* | 7/2022 | Horvath ................... G01K 7/22 |
| 2023/0137721 | A1* | 5/2023 | Chang ................... H01M 4/625 |
| | | | 429/162 |
| 2023/0163279 | A1* | 5/2023 | Kim .................... H01M 4/0404 |
| | | | 429/322 |

FOREIGN PATENT DOCUMENTS

| | | | | |
|---|---|---|---|---|
| CN | 113346064 | A | * | 9/2021 |
| CN | 115172692 | A | * | 10/2022 |
| JP | 5928252 | B2 | | 6/2016 |
| JP | 2019096610 | A | | 6/2019 |
| JP | 6716324 | B2 | | 7/2020 |
| KR | 100881637 | B1 | | 2/2009 |
| KR | 101310430 | B1 | | 9/2013 |
| KR | 1020190022310 | A | | 3/2019 |
| KR | 102013832 | B1 | | 8/2019 |
| WO | WO-2019117364 | A1 | * | 6/2019 ............... B22F 1/02 |
| WO | 2020046444 | A1 | | 3/2020 |

OTHER PUBLICATIONS

Machine translation of CN 113346064 (no date) (Year: 0000).*
Frank Puglia et al., "Development of true prismatic lithium-ion cells for high rate and low temperature applications," Journal of Power Sources, 2001, pp. 40-46, vol. 96.
Kai Yan et al., "Selective deposition and stable encapsulation of lithium through heterogeneous seeded growth," Nature Energy, Feb. 22, 2016, pp. 1-8, vol. 1.
Yong-Gun Lee et al., "High-energy long-cycling all-solid-state lithium metal batteries enabled by silver-carbon composite anodes," Nature Energy, 2020, pp. 1-10.
Weijian Hao et al., "Displacement reaction-based Ag2S electrode for lithium batteries with high volumetric energy density", Solid State Ionics 340 (2019) 115015, 6 pp.
Xingwen Yu et al., "Na2S-Carbon Nanotube Fabric Electrodes for Room-Temperature Sodium-Sulfur Batteries", Chem. Eur. J. 2015, 21, 4233-4237.

* cited by examiner

LITHIUM BATTERY AND METHOD OF PREPARING THE SAME

CROSS-REFERENCE TO RELATED APPLICATION

This application claims priority to and the benefit of Korean Patent Application No. 10-2021-0051354, filed on Apr. 20, 2021, in the Korean Intellectual Property Office, and all the benefits accruing therefrom under 35 U.S.C. § 119, the content of which in its entirety is herein incorporated by reference.

BACKGROUND

1. Field

The present disclosure relates to a lithium battery and a method of preparing the same.

2. Description of the Related Art

Lithium secondary batteries are high-performance secondary batteries having high energy density, and may be used in various applications, such as in electric vehicles. Nonetheless, there remains a need for improved materials having reduced resistance to improved performance and provide improved charge/discharge efficiency and capacity.

SUMMARY

Provided are lithium batteries having improved charge/discharge efficiency and lifespan characteristics.

Provided are methods of preparing the lithium batteries.

Additional aspects will be set forth in part in the description which follows and, in part, will be apparent from the description, or may be learned by practice of the presented embodiments of the disclosure.

According to an aspect of an embodiment, a lithium battery includes a cathode, an anode, a liquid-impermeable ion-conductive membrane between the cathode and the anode, and an interlayer including a metal-carbon composite between the anode and the liquid-impermeable ion-conductive membrane, wherein the metal-carbon composite includes a carbonaceous material, a metal chemically bonded to the carbonaceous material, and a metal sulfide, a metal fluoride, or a combination thereof chemically bonded to the carbonaceous material.

According to an aspect of an embodiment, a method of preparing the lithium battery includes providing a composition for an interlayer including a metal-carbon composite, a binder, and a solvent; coating the composition on a first surface of a liquid-impermeable ion-conductive membrane; drying the composition to provide an interlayer; arranging an anode on the interlayer; and arranging a cathode on an opposite second surface of the liquid-impermeable ion-conductive membrane to prepare the lithium battery.

According to an aspect of an embodiment, disclosed is a metal-carbon composite for use in an interlayer of a battery, the metal-carbon composite including a carbonaceous material having an average particle diameter of about 10 nanometers to about 900 nanometers, the metal including carbon black, a vapor grown carbon fiber, acetylene black, activated furnace black, Ketjen black, a carbon nanofiber, natural graphite, artificial graphite, a carbon nanotube, graphene, or a combination thereof; a metal having a size of about 0.5 nanometers to about 300 nanometers chemically bonded to the carbonaceous material, the metal including silver, gold, platinum, palladium, silicon, aluminum, bismuth, tin, zinc, gallium, indium, or a combination thereof; and a metal sulfide, a metal fluoride, or a combination thereof having a size of about 0.1 nanometers to about 10 nanometers chemically bonded to the carbonaceous material, the metal sulfide, the metal fluoride, or the combination thereof including a silver sulfide, a tin sulfide, a zinc sulfide, a platinum sulfide, a silicon sulfide, a bismuth sulfide, a gold sulfide, a gallium sulfide, an indium sulfide, an aluminum sulfide, a silver fluoride, a tin fluoride, a zinc fluoride, a silicon fluoride, a bismuth fluoride, a gallium fluoride, an indium fluoride, an aluminum fluoride, or a combination thereof, wherein a total amount of the metal and the metal sulfide, the metal fluoride, or the combination thereof is about 15 weight percent to about 40 weight percent, based on a total weight of the metal-carbon composite.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
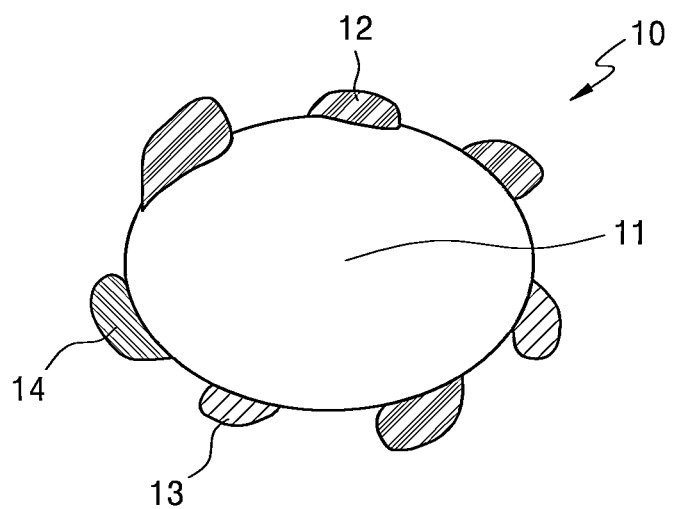
FIG. 1A is a schematic view of an embodiment of a structure of a metal-carbon composite.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a lithium battery and a method of preparing the same will be described in further detail.

According to an embodiment, a lithium battery includes a cathode, an anode, and a liquid-impermeable ion-conductive membrane between the cathode and the anode, and an interlayer including a metal-carbon composite is arranged between the anode and the liquid-impermeable ion-conductive membrane.

A thickness of the interlayer may be, for example, in a range of about 0.1 micrometers (μm) to about 50 μm, about 0.5 μm to about 40 μm, or about 1 μm to about 30 μm.

The metal-carbon composite includes a carbonaceous material; and a metal and a metal sulfide, a metal fluoride, or a combination thereof that are arranged on the carbonaceous material and each chemically bonded to the carbonaceous material.

The lithium battery may be, for example, a solid battery.

The lithium battery may be, for example, a lithium metal battery including a lithium anode. The lithium anode may include lithium metal, a lithium alloy, or a combination thereof.

In a solid battery including a cathode, a lithium anode, and an oxide-based solid electrolyte between the cathode and the lithium anode, a mixture of a carbonaceous material and silver nanoparticles may be used as an interlayer material formed in an interface between the anode and the oxide-based solid electrolyte.

The silver particles may not be uniformly distributed in the mixture of carbon and silver particles, which may be formed by mixing the carbonaceous material and silver particles. The lack of uniform distribution is understood to result in an increase in interfacial resistance between the anode and the oxide-based solid electrolyte, resulting in non-uniform lithium growth, may cause a short-circuit and low charge/discharge efficiency, and thus may make it difficult to maintain high battery capacity.

The present inventors have surprisingly found that an interlayer arranged between an anode and a solid electrolyte and including a metal-carbon composite as disclosed may resolve the problems described herein. The interlayer is arranged between an anode and a solid electrolyte, and the interlayer may have excellent barrier characteristics, effectively blocking a reaction between the anode and the solid electrolyte.

In the lithium battery according to an embodiment, the interlayer includes a metal-carbon composite, and the metal-carbon composite includes a carbonaceous material; and a metal and a metal sulfide, a metal fluoride, or a combination thereof, that are each arranged on the carbonaceous material and each chemically bonded to the carbonaceous material.

As used herein, the metal-carbon composite may be distinguished from a simple mixture of a metal and carbon or a mixture in which a metal and carbon are physically bound by a binder because in the metal-carbon composite a metal and a metal sulfide, a metal fluoride, or a combination thereof are each bound to a carbonaceous material through a chemical bond. The presence of the chemical bond may be confirmed via infrared spectroscopy.

The metal may be silver (Ag), gold (Au), platinum (Pt), palladium (Pd), silicon (Si), aluminum (Al), bismuth (Bi), tin (Sn), zinc (Zn), gallium (Ga), indium (In), or a combination thereof.

The metal sulfide may be silver sulfide, tin sulfide, zinc sulfide, platinum sulfide, silicon sulfide, bismuth sulfide, gold sulfide, gallium sulfide, indium sulfide, aluminum sulfide, or a combination thereof, and the metal fluoride may be silver fluoride, tin fluoride, zinc fluoride, gallium fluoride, indium fluoride, silicon fluoride, bismuth fluoride, aluminum fluoride, or a combination thereof. An amount of the metal in the metal-carbon composite may be in a range of about 1 part to about 50 parts by weight, for example, about 5 parts to about 45 parts by weight or about 10 parts to about 40 parts by weight, based on 100 parts by weight of the metal-carbon composite, and an amount of the metal sulfide, the metal fluoride, or the combination thereof may be in a range of about 0.01 parts to about 10 parts by weight, for example, about 0.05 parts to about 5 parts by weight or about 0.1 parts to about 1 part by weight, based on 100 parts by weight of the metal-carbon composite.

In the metal-carbon composite, the total amount of the metal and the metal sulfide, the metal fluoride, or the combination thereof may be in a range of about 1 weight percent (wt %) to about 60 wt %, about 8 wt % to about 60 wt %, about 10 wt % to about 50 wt %, about 15 wt % to about 40 wt %, or about 20 wt % to about 30 wt %. When the amount of the metal and the metal sulfide, the metal fluoride, or the combination thereof is within the disclosed ranges, cycle characteristics of the lithium battery may further be improved.

The carbonaceous material may include, for example, amorphous carbon, crystalline carbon, or a combination thereof. The amorphous carbon may include a vapor grown carbon fiber ("VGCF"), activated furnace black, carbon black ("CB"), acetylene black ("AB"), Ketjen black ("KB"), a carbon nanofiber, or a combination thereof, and the crystalline carbon may include natural graphite, artificial graphite, a carbon nanotube ("CNT"), graphene, or a combination thereof.

The amorphous carbon and the crystalline carbon are not limited thereto. Any suitable amorphous carbon or crystalline carbon material may be used.

An average particle diameter of the carbonaceous material may be, for example, about 4 micrometers ($\mu$m) or less, about 2 $\mu$m or less, about 1 $\mu$m or less, or about 900 nanometers (nm) or less. An average particle diameter of the carbonaceous material in the form of particles may be, for example, in a range of about 10 nanometers (nm) to about 4 $\mu$m, about 10 nm to about 2 $\mu$m, about 10 nm to about 1 $\mu$m, or about 10 nm to 900 nm. When the average particle diameter of the carbonaceous material is within the disclosed ranges, reversible absorbing, desorbing, or a combination thereof of lithium during charge and discharge may further be facilitated. The average particle diameter of the carbonaceous material may be, for example, a median diameter (D50) measured by a laser-diffraction particle size distribution meter. In an embodiment, an average particle diameter of a carbonaceous anode active material may be an arithmetic average value of the particle sizes obtained from a scanning electron microscope image.

In the metal-carbon composite according to an embodiment, a size of the metal may be in a range of about 0.5 nm to about 300 nm, about 1 nm to about 200 nm, or about 10 nm to about 150 nm, and a size of the metal sulfide, the metal fluoride, or the combination thereof may be in a range of about 0.1 nm to about 10 nm, about 0.3 nm to about 5 nm, about 0.5 nm to about 2 nm, or about 0.5 nm to about 1 nm.

An amount of silver according to inductively coupled plasma ("ICP") analysis on the silver-carbon composite is in a range of about 20 weight percent (wt %) to about 30 wt %, about 21 wt % to about 28 wt %, about 22 wt % to about 25 wt %, or, for example, about 24.1 wt % to about 24.8 wt %, based on a total weight of the metal-carbon composite.

The anode according to an embodiment may be a lithium anode including lithium metal, a lithium alloy, or a combination thereof. In an embodiment, the anode may be in an anodeless state, e.g., the lithium metal or lithium alloy may not be present during assembly of a battery and may be a lithium precipitation layer formed after charging of the battery.

In an embodiment, the anode may include a carbonaceous anode active material or a carbonaceous anode active material and a metal element. The metal element may include indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), zinc (Zn), or a combination thereof.

The anode may include an anode current collector and a first anode active material layer, and a second anode active material layer may be arranged on the first anode active material layer, between the anode current collector and the first anode active material layer, or a combination thereof, wherein the second anode active material layer may include lithium or a lithium alloy.

The metal-carbon composite according to an embodiment may be a silver-carbon composite including a carbonaceous material; and silver (Ag) and $Ag_2S$, $AgF$, or a combination thereof that are arranged on the carbonaceous material and chemically bonded to the carbonaceous material.

In the silver-carbon composite, $Ag_2S$ may be, for example, $Ag_2S$ having an alpha phase structure. In an aspect, the silver sulfide having an alpha phase structure has better stability as compared with that of a silver sulfide ($Ag_2S$) having a beta phase.

Acanthite (alpha-phase silver sulfide, $\alpha$-$Ag_2S$) is a form of silver sulfide with the formula, $Ag_2S$, which crystallizes in the monoclinic system and is the stable form of silver sulfide below 173° C. (343° F.).

The lithium battery according to an embodiment may have excellent stability when $Ag_2S$ of the silver-carbon composite has an $\alpha$-$Ag_2S$ structure, and, for example, the stability of the lithium battery may be excellent at a temperature of about 150° C. or less.

The metal being chemically bonded to a surface of the carbonaceous material in the silver-carbon composite may be indicated by shifting of a carbon-carbon stretching infrared (IR) resonance as compared with a carbon-carbon stretching IR resonance of a mixture of silver and a carbonaceous material, in an infrared ("IR") analysis spectrum of the silver-carbon composite.

In the X-ray diffraction analysis of the silver-carbon composite according to an embodiment, a ratio (IB:IA) of an intensity (IB) of a peak B of $\alpha$-$Ag_2S$ to an intensity (IA) of a peak A corresponding to an Ag(111) face may be in a range of about 0.03:1 to about 0.06:1, about 0.03:1 to about 0.05:1, or about 0.04:1 to about 0.05:1. The diffraction angle of peak A may appear in a range of about 38°2θ to about 38.6°2θ, about 38.1°2θ to about 38.5°2θ, or about 38.2°2θ to about 38.3°2θ, when analyzed with CuKa radiation. The diffraction angle 2θ of peak B may appear in a range of about 36°2θ to about 37.2°2θ, about 36.3°2θ to about 37.2°2θ, about 36.5°2θ to about 37.2°2θ, or about 36.9°2θ to about 37.2°2θ, or about 37°2θ, when analyzed with CuKa radiation.

In the X-ray diffraction analysis of the silver-carbon composite, a full width at half maximum ("FWHM") of the diffraction angle of the peak A corresponding to the Ag(111) face may be in a range of about 0.1°2θ to about 0.3°2θ, about 0.110°2θ to about 0.280°2θ, or about 0.127°2θ to about 0.265°2θ, when analyzed with CuKa radiation. The diffraction angle 2θ of peak A may appear in a range of about 38°2θ to about 38.6°2θ, about 38.1°2θ to about 38.5°2θ, or about 38.2°2θ to about 38.3°2θ, when analyzed with CuKa radiation.

In the X-ray photoelectron spectroscopy of the metal-carbon composite, an atomic surface composition of fluorine may be in a range of about 0.4 atomic percent (atom %) to about 2 atom %, for example, about 0.5 atom % to about 1.5 atom % or about 0.6 atom % to about 1 atom %, based on a total content of the surface, and an atomic surface composition of sulfur may be in a range of about 0.6 atom % to about 1.6 atom %, for example, about 0.4 atom % to about 2 atom % or about 0.4 atom % to about 2 atom %, based on a total content of the surface. The atomic surface composition of fluorine denotes an amount corresponding to F1s, e.g., the F1s spectrum, and the atomic surface composition of sulfur denotes an amount corresponding to S2p, e.g., the S2p spectrum.

The interlayer may include a binder. The binder may be, for example, polyvinylidene fluoride, a polyvinyl alcohol copolymer, carboxymethyl cellulose, styrene-butadiene rubber ("SBR"), polytetrafluoroethylene, polyethylene, a vinylidene fluoride/hexafluoropropylene copolymer, polyacrylonitrile, polymethyl methacrylate, or a combination thereof. When the interlayer includes a binder, the interlayer may be stabilized between the anode layer and the liquid-impermeable ion-conductive membrane. Cracks of the interlayer may be suppressed in spite of volume change, relative position change, or a combination thereof of the first anode active material layer during the charge/discharge process.

An amount of the metal-carbon composite in the interlayer may be in a range of about 90 parts to about 99 parts by weight, for example, about 91 parts to about 98 parts by weight or about 92 to about 97 parts by weight, and an amount of the binder may be in a range of about 1 part to about 10 parts by weight, for example, about 2 parts to about 9 parts by weight or about 3 parts to about 8 parts by weight, each based on 100 parts by weight of the total weight of the interlayer.

Figure 1B:
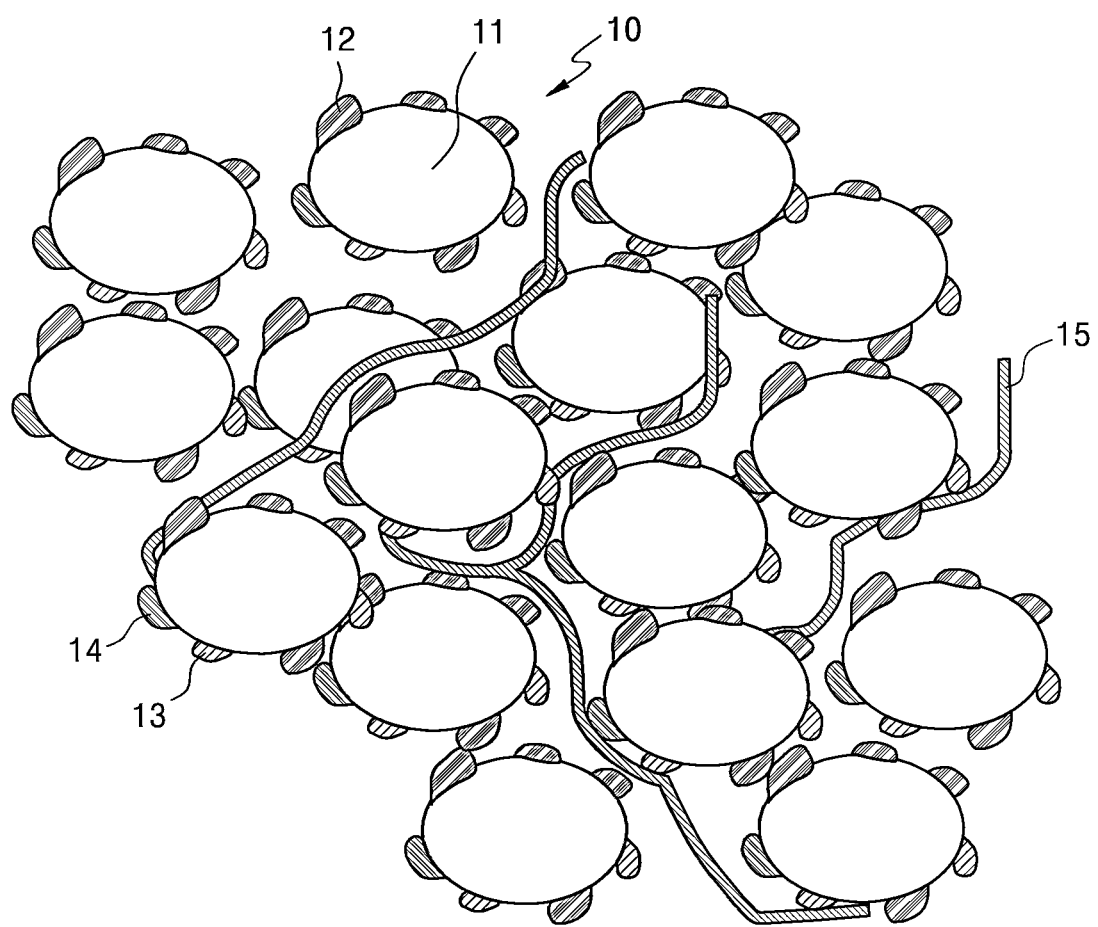
FIG. 1B is a schematic view of an embodiment of a structure of an interlayer including the metal-carbon composite.

Referring to FIG. 1A and FIG. 1B, a structure of a metal-carbon composite 10 according to an embodiment will be described.

The metal-carbon composite 10 has a structure including a carbonaceous material 11; and a metal 12, a metal sulfide 13, and a metal fluoride 14 that are chemically bonded on the carbonaceous material 11.

The metal-carbon composite 10 of FIG. 1A has a structure including both the metal sulfide 13 and the metal fluoride 14. A metal-carbon composite 10 according to an embodiment may have a structure including a carbonaceous material 11; and a metal 12 and a metal sulfide 13 that are chemically bonded on the carbonaceous material 11. A metal-carbon composite 10 according to an embodiment may include a carbonaceous material 11; and a metal 12 and a metal fluoride 14 that are chemically bonded on the carbonaceous material 11.

As shown in FIG. 1A, the metal 12, the metal sulfide 13, and the metal fluoride 14 are chemically bonded to a surface of the carbonaceous material 11.

FIG. 1A shows a metal-carbon composite particle, and FIG. 1B shows a structure of an interlayer in which a plurality of the metal-carbon composite particles of FIG. 1A are bound to each other by a binder 15. As shown, particles of the metal-carbon composite 10 are uniformly distributed without being agglomerated.

The metal-carbon composite 10 may be, for example, a silver-carbon composite. The silver-carbon composite has a structure in which silver, silver sulfide ($Ag_2S$), and silver fluoride (AgF) chemically bonded on the carbonaceous material 11 are uniformly distributed, and, unlike in a metal-carbon mixture, the silver, silver sulfide, and silver fluoride are bonded to the carbonaceous material 11 through a strong chemical bond. The bond may be confirmed by a wavenumber of a carbon-carbon stretching band of the IR spectroscopy.

The silver, silver sulfide, and silver fluoride being chemically bonded on the carbonaceous material may be confirmed via a carbon-carbon stretching band obtained from the IR spectroscopy analysis. When silver and a carbonaceous material are mixed, the carbon-carbon stretching band may appear in a range of about 1253 $cm^{-1}$ to about 1353 $cm^{-1}$. The silver-carbon composite according to an embodiment has silver, silver sulfide ($Ag_2S$), and silver fluoride (AgF) chemically bonded on a carbonaceous material, which may influence a carbon-carbon stretching band, and thus the wavenumber may be shifted.

The interlayer according to an embodiment arranged between the anode and the liquid-impermeable ion-conductive membrane has excellent barrier characteristics, and reactions between the anode and the liquid-impermeable ion-conductive membrane may be effectively prevented.

A thickness of the liquid-impermeable ion-conductive membrane may be in a range of about 10 μm to about 150 μm, about 15 μm to about 90 μm, or, for example, about 20 μm to about 50 μm.

The liquid-impermeable ion-conductive membrane may be, for example, a solid ion-conductive membrane, a composite membrane including a solid ionic conductor and a non-ionic conductor, or a combination thereof.

The solid ionic conductor may include $Li_{1+x}Ti_{2-x}Al(PO_4)_3$ ("LTAP") (wherein 0≤x≤4), a Li—Ge—P—S-based material, $Li_{1+x+y}Al_xTi_{2-x}Si_yP_{3-y}O_{12}$ (wherein 0<x<2 and 0≤y<3), $BaTiO_3$, $Pb(Zr_aTi_{1-a})O_3$ ("PZT") (wherein 0<a<1), $Pb_{1-x}La_xZr_{1-y}Ti_yO_3$ ("PLZT") (wherein 0≤x<1 and 0≤y<1), $Pb(Mg_{1/3}Nb_{2/3})O_3$—$PbTiO_3$ ("PMN-PT"), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, wherein 0<x<2 and 0<y<3), lithium aluminum titanium phosphate ($Li_xAl_yTi_z(PO_4)_3$, wherein 0<x<2, 0<y<1, and 0<z<3), $Li_{1+x+y}(Al_{1-a}Ga_a)_x(Ti_{1-b}Ge_b)_{2-x}Si_yP_{3-y}O_{12}$ (wherein 0≤a≤1, 0≤b≤1, 0≤x≤1 and 0≤y≤1), lithium lanthanum titanate ($Li_xLa_yTiO_3$, wherein 0<x<2 and 0<y<3), lithium germanium thiophosphate ($Li_xGe_yP_zS_w$, wherein 0<x<4, 0<y<1, 0<z<1, and 0<w<5), lithium nitride ($Li_xN_y$, wherein 0<x<4 and 0<y<2), a $SiS_2$-based glass ($Li_xSi_yS_z$, wherein 0<x<3, 0<y<2, and 0<z<4), a $P_2S_5$-based glass ($Li_xP_yS_z$, wherein 0<x<3, 0<y<3, and 0<z<7), $Li_2O$, LiF, LiOH, $Li_2CO_3$, $LiAlO_2$, a $Li_2O$—$Al_2O_3$—$SiO_2$—$P_2O_5$—$TiO_2$—$GeO_2$-based ceramic, a Garnet-type ceramic, $Li_{3+x}La_3M_2O_{12}$ (wherein 0≤x≤5, and M=Te, Nb, or Zr), or a combination thereof.

The solid ionic conductor may be, for example, $Li_{1.4}Ti_{1.6}Al_{0.4}P_3O_{12}$, $Li_{1.3}Ti_{1.7}Al_{0.3}P_3O_{12}$, $Li_{10}GeP_2S_{12}$, $Li_7La_3Zr_2O_{12}$ ("LLZ"), $Li_2PO_3$ ("LiPON"), $Li_5La_3Ta_2O_{12}$, $La_{0.33}La_{0.55}TiO_3$, $Li_{1.5}Al_{0.5}Ge_{1.5}P_3O_{12}$, $Li_3BO_3$, $Li_4SiO_4$—$Li_3PO_4$, $Li_4SiO_4$, $Li_{1/3}La_{1/3}TiO_3$, $Li_2O$—$Al_2O_3$—$SiO_2$—$P_2O_5$—$TiO_2$—$GeO_2$, or a combination thereof.

The solid ionic conductor may be an oxide-based solid electrolyte, which is, for example, $Li_{1+x+y}Al_xTi_{2-x}Si_yP_{3-y}O_{12}$ (wherein 0<x<2 and 0≤y<3), $BaTiO_3$, $Pb(Zr_aTi_{1-a})O_3$ ("PZT") (wherein 0<a<1), $Pb_{1-x}La_xZr_{1-y}Ti_yO_3$ ("PLZT") (wherein 0≤x<1 and 0≤y<1), $Pb(Mg_{1/3}Nb_{2/3})O_3$—$PbTiO_3$ ("PMN-PT"), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ (wherein 0<x<2 and 0<y<3), $Li_xAl_yTi_z(PO_4)_3$ (wherein 0<x<2, 0<y<1, and 0<z<3), $Li_{1+x+y}(Al_{1-a}Ga_a)_x(Ti_{1-b}Ge_b)_{2-x}Si_yP_{3-y}O_{12}$ (wherein 0≤a≤1, 0≤b≤1, 0≤x≤1 and 0≤y≤1), $Li_xLa_yTiO_3$ (wherein 0<x<2 and 0<y<3), $Li_2O$, LiOH, $Li_2CO_3$, $LiAlO_2$, $Li_2O$—$Al_2O_3$—$SiO_2$—$P_2O_5$—$TiO_2$—$GeO_2$, $Li_{3+x}La_3M_2O_{12}$ (wherein M=Te, Nb, or Zr, and x is an integer of 1 to 10), or a combination thereof. The oxide-based solid electrolyte may be, for example, a Garnet-type solid electrolyte such as $Li_7La_3Zr_2O_{12}$ ("LLZO") and $Li_{3+x}La_3Zr_{2-a}M_aO_{12}$ (M-doped LLZO, wherein M=Ga, W, Nb, Ta, or Al, x is an integer of 1 to 10, and 0.05≤a≤0.7).

In an embodiment, the liquid-impermeable ion-conductive membrane is a lithium lanthanum zirconium oxide (LLZO) solid electrolyte, which may include, for example, $Li_7La_3Zr_2O_{12}$ ("LLZO"), $Li_{6.4}La_3Zr_{1.7}W_{0.3}O_{12}$, $Li_{6.5}La_3Zr_{1.5}Ta_{0.3}O_{12}$, $Li_7La_3Zr_{2.7}W_{0.3}O_{12}$, $Li_{4.9}La_{2.5}Ca_{0.5}Zr_{1.7}Nb_{0.3}O_{12}$, $Li_{4.9}Ga_{2.1}La_3Zr_{1.7}W_{0.3}O_{12}$, $Li_{6.4}La_3Zr_{1.7}W_{0.3}O_{12}$, $Li_7La_3Zr_{1.5}W_{0.5}O_{12}$, $Li_7La_{2.75}Ca_{0.25}Zr_{1.75}Nb_{0.25}O_{12}$, $Li_7La_3Zr_{1.5}Nb_{0.5}O_{12}$, $Li_7La_3Zr_{1.5}Ta_{0.5}O_{12}$, $Li_{6.272}La_3Zr_{1.7}W_{0.3}O_{12}$, $Li_{5.39}Ga_{1.61}La_3Zr_{1.7}W_{0.3}O_{12}$, $Li_{6.5}La_3Zr_{1.5}Ta_{0.3}O_{12}$, or a combination thereof.

The non-ionic conductor may be, for example, a polymer. The polymer may be, for example, polyvinyl alcohol, polyacrylonitrile, polyimide, epoxy resin, acrylic resin, polyethylene, polyethylene oxide, polyvinylidene fluoride, polyvinylpyrrolidone, poly2-vinylpyridine, polytetrafluoroethylene, a tetrafluoroethylene-hexafluoropropylene copolymer, polychlorotrifluoroethylene, a perfluoroalkoxy copolymer, fluorinated cyclic ether, polyethylene oxide diacrylate, polyethylene oxide dimethacrylate, polypropylene oxide diacrylate, polypropylene oxide dimethacrylate, polymethylene oxide diacrylate, polymethylene oxide dimethacrylate, polyalkyldiol diacrylate, polyalkyldiol dimethacrylate, polydivinylbenzene, polyether, polycarbonate, polyamide, polyester, polycarboxylic acid, polysulfonic acid, polysulfone, polystyrene, polypropylene, poly (p-phenylene), polyacetylene, poly(p-phenylene vinylene), polyaniline, polypyrrole, polythiophene, poly(2,5-ethylene vinylene), polyacene, poly(naphthalene-2,6-diyl), polyethylene oxide, polypropylene oxide, a copolymer of vinylidene fluoride and hexafluoropropylene, poly(vinyl acetate), poly(vinyl butyral-co-vinyl alcohol-co-vinyl acetate), poly(methyl methacrylate-co-ethyl acrylate), polyvinyl chloride co-vinyl acetate, poly(1-vinylpyrrolidone-co-vinyl acetate), polyvinylpyrrolidone, polyacrylate, polymethacrylate, polyurethane, polyvinyl ether, acrylonitrile-butadiene rubber, styrene-butadiene rubber, acrylonitrile-butadiene-styrene rubber, a sulfonated styrene/ethylene-butylene triblock copolymer, ethoxylated neopentyl glycol diacrylate, ethoxylated bisphenol A diacrylate, ethoxylated aliphatic urethane acrylate, a polymer obtained from an acrylate monomer of ethoxylated alkylphenol acrylate, alkyl acrylate, or a combination thereof, or a combination thereof.

As the liquid-impermeable ion-conductive membrane, a composite membrane disclosed in U.S. Patent Nos. US20150079485A1, US20160181585A1, US20170093002A1, or US20180040904A1, the content of which are incorporated herein by reference in their entirety, may be used. The composite membrane may be a membrane including an organic membrane having a plurality of through holes and a plurality of ionic conductive inorganic particles arranged in the through holes.

An amount of a polymer in the membrane may be, for example, in a range of about 50 parts to about 80 parts by weight, for example, about 55 parts to about 75 parts by weight or about 60 parts to about 70 parts by weight, based on 100 parts by weight of the total weight of the composite membrane, and the polymer may be, for example, polyvinyl alcohol, polyacrylonitrile, polyimide, epoxy resin, acrylic resin, or polyethylene. The membrane may be, for example, a membrane including LTAP and polyvinyl alcohol or a membrane including lithium aluminum titanium phosphate (LTAP) and an epoxy resin. For example, LTAP may be a lithium aluminum titanium phosphate ($Li_xAl_yTi_z(PO_4)_3$, wherein 0<x<2, 0<y<1, and 0<z<3), such as $Li_{1.4}Ti_{1.6}Al_{0.4}P_3O_{12}$ or $Li_{1.3}Ti_{1.7}Al_{0.3}P_3O_{12}$.

Hereinafter, a method of preparing the lithium battery according to an embodiment will be described.

The lithium battery according to an embodiment may be prepared by coating a composition for an interlayer including a metal-carbon composite, a binder, and a solvent on a surface of a liquid-impermeable ion-conductive membrane to coat the surface of the liquid-impermeable ion-conductive membrane and then drying the resultant composition to prepare an interlayer; arranging an anode on the interlayer; and arranging a cathode on the other, e.g., opposite, surface of the liquid-impermeable ion-conductive membrane.

The metal-carbon composite may be prepared by mixing a carbonaceous material and a solvent with i) a sulfur-containing metal precursor, ii) a sulfur- and fluorine-containing metal precursor, or a combination thereof to obtain a precursor mixture; drying the precursor mixture to obtain a dried precursor mixture; and heat-treating the dried precursor mixture at a temperature of about 900° C. or lower, for example, about 100° C. to about 900° C. or about 200° C. to about 800° C.

The heat-treating of the dried precursor mixture may undergo a first heat-treatment performed at a temperature of about 900° C. or lower or in a range of about 350° C. to about 800° C. or about 500° C. to about 650° C.

In an embodiment, the heat-treating of the dried precursor mixture may include a first heat-treatment performed at a temperature of about 400° C. or lower, for example, about 100° C. to about 400° C. or about 200° C. to about 350° C., or about 300° C. or lower and a second heat-treatment performed at a temperature in a range of about 350° C. to about 800° C., for example, about 900° C. to about 900° C. or about 900° C. to about 900° C. The second heat-treatment may be performed at a temperature higher than that of the first heat-treatment. When the heat-treating is performed under such conditions, a size of the metal-carbon composite may be controlled to be a desired size.

In the two-step heat-treatment, when the first heat-treatment is performed at a temperature of about 300° C. or lower, the precursors may be dissolved on the carbonaceous material without decomposition of the sulfur-containing metal precursor, the sulfur- and fluorine-containing metal precursor, or a combination thereof and the desired metal carbon composite may be obtained. A heat-treating time for the first heat-treatment and the second heat-treatment may vary depending on the first and second heat-treatment temperatures, respectively, but, for example, the first heat-treatment may be performed for about 0.5 hours to about 3 hours, for example, about 1 hour to about 2.5 hours or about 1.5 hours to about 2.5 hours, and the second heat-treatment may be performed for about 0.1 hours to about 3 hours for example, about 0.5 hours to about 2.5 hours or about 1 hour to about 2.5 hours.

During the first heat-treatment and the second heat-treatment, the heat-treating atmosphere may be an inert atmosphere. An inert gas in the inert atmosphere may be argon or nitrogen.

A temperature increase rate in the first heat-treatment may be in a range of about 1 degree Celsius per minute (° C./min) to about 50° C./min or 0.05° C./min to about 50° C./min, for example, about 0.1° C./min to about 40° C./min or about 0.5° C./min to about 30° C./min, and a temperature increase rate in the second heat-treatment may be in a range of about 1° C./min to about 20° C./min or 0.05° C./min to about 20° C./min, for example, about 0.1° C./min to about 15° C./min or about 0.5° C./min to about 10° C./min. The temperature increase rate of the first heat-treatment may be controlled to be higher than that of the second heat-treatment. When the temperature increase rate of the first heat-treatment is controlled higher than that of the second heat-treatment as such, a size of the metal-carbon composite may be controlled to be a desired size.

A standing process may be included between the first heat-treatment and the second heat-treatment. A temperature of the standing process may be in or increase to a range of about 300° C. to about 600° C., for example, about 350° C. to about 550° C. or about 400° C. to about 500° C., at a temperature increase rate in a range of about 1° C./min to about 3° C./min, for example, about 1.25° C./min to about 2.75° C./min or about 1.5° C./min to about 2.5° C./min, and the standing process may be performed for about 1 hour to about 3 hours, for example, about 1.25 hour to about 2.75 hours or about 1.5 hour to about 2.5 hours, within this temperature range.

In the first heat-treatment, a silver precursor may be heated and be in a liquid state, filling carbon pores, and the silver precursor may interact with the carbonaceous material due to wetting thereof. Some or most organic moieties may be decomposed in the second heat-treatment, and some organic moieties may remain in carbon and bind silver nanoparticles to a surface of carbon.

The sulfur-containing metal precursor may be silver methanesulfonate, silver ethanesulfonate, silver propanesulfonate, silver-2-propanesulfonate, silver butanesulfonate, silver 2-butanesulfonate, silver pentanesulfonate, silver 1-sulfonate, silver 2-hydroxypropane-1-sulfonate, silver 2-hydroxybutane-1-sulfonate, silver 2-hydroxypentanesulfonate, silver p-toluenesulfonate, silver p-phenolsulfonate, or a combination thereof.

The sulfur- and fluorine-containing metal precursor may be silver trifluoromethanesulfonate, silver bis(trifluoromethanesulfonyl)imide, silver bis(fluorosulfonyl)imide, silver fluorosulfonyl-(trifluoromethanesulfonyl)imide, or a combination thereof.

The drying of the precursor mixture may be performed at a temperature in a range of about 30° C. to about 90° C. or about 40° C. to about 80° C. When the drying process is performed a metal-carbon composite, in which a bond of a metal sulfide, a metal fluoride, or a combination thereof to a surface of a carbonaceous material may be maintained, may be prepared.

A method of coating the composition for an interlayer a metal-carbon composite, a binder, and a solvent on a surface of the liquid-impermeable ion-conductive membrane may be a process of immersing, spin coating, drop casting, spray coating, spray pyrolysis, solution infiltration, roll coating, spray coating, dip coating, flow coating, doctor blade coating, dispensing, inkjet printing, offset printing, screen printing, pad printing, gravure printing, flexographic printing, or lithographic printing.

In the composition for an interlayer, the solvent may be methanol, ethanol, dimethoxyethane, water, or a combination thereof. When ethanol is used as the solvent, a metal particle size such as a silver crystal size may be reduced, and the crystal particle size may be controlled to be a desired size, and a loading amount may further be increased.

The liquid-impermeable ion-conductive membrane may be, for example, an oxide-based solid electrolyte. The oxide-based solid electrolyte may be used after performing surface modification through acid treatment. In the acid treatment, an aqueous hydrochloric acid solution, an aqueous sulfuric acid solution, or a combination thereof may be used.

When the oxide-based solid electrolyte is acid-treated, a part of an inorganic lithium ionic conductor constituting the oxide-based solid electrolyte may be selectively eluted by the acid and form a porous structure. When the porous structure is formed as such, lithium carbonate may be removed up to a sub-surface of the oxide-based solid electrolyte, and lithium of the lithium ionic conductor may be partially substituted. A crystallinity of the oxide-based solid electrolyte may be improved, an average grain size of the oxide-based solid electrolyte may be increased, a metallic compound which may be a cause of a short-circuit may be not formed, and current concentration may be prevented, which may result in suppression of a short-circuit at a high current density. A protonated inorganic lithium ionic conductor may exist on a surface of the oxide-based solid electrolyte, and a specific surface area may increase, which may result in a significant decrease in interfacial resistance between the anode and the oxide-based solid electrolyte.

When the inorganic lithium ionic conductor is protonated by the acid treatment on a surface of the oxide-based solid electrolyte, protons may be substituted for lithium, and an amount of the protons may be in a range of about 0.01 mol % to about 50 mol % or, for example, about 0.1 mol % to about 20 mol %, based on a total content of the oxide-based solid electrolyte.

According to an embodiment, provided is a metal-carbon composite for a solid battery. The metal-carbon composite includes a carbonaceous material; and a metal and a metal sulfide, a metal fluoride, or a combination thereof that are arranged on the carbonaceous material and chemically bonded to the carbonaceous material. The metal-carbon composite may be identical to the metal-carbon composite forming the interlayer of the lithium battery described herein.

Figure 8:
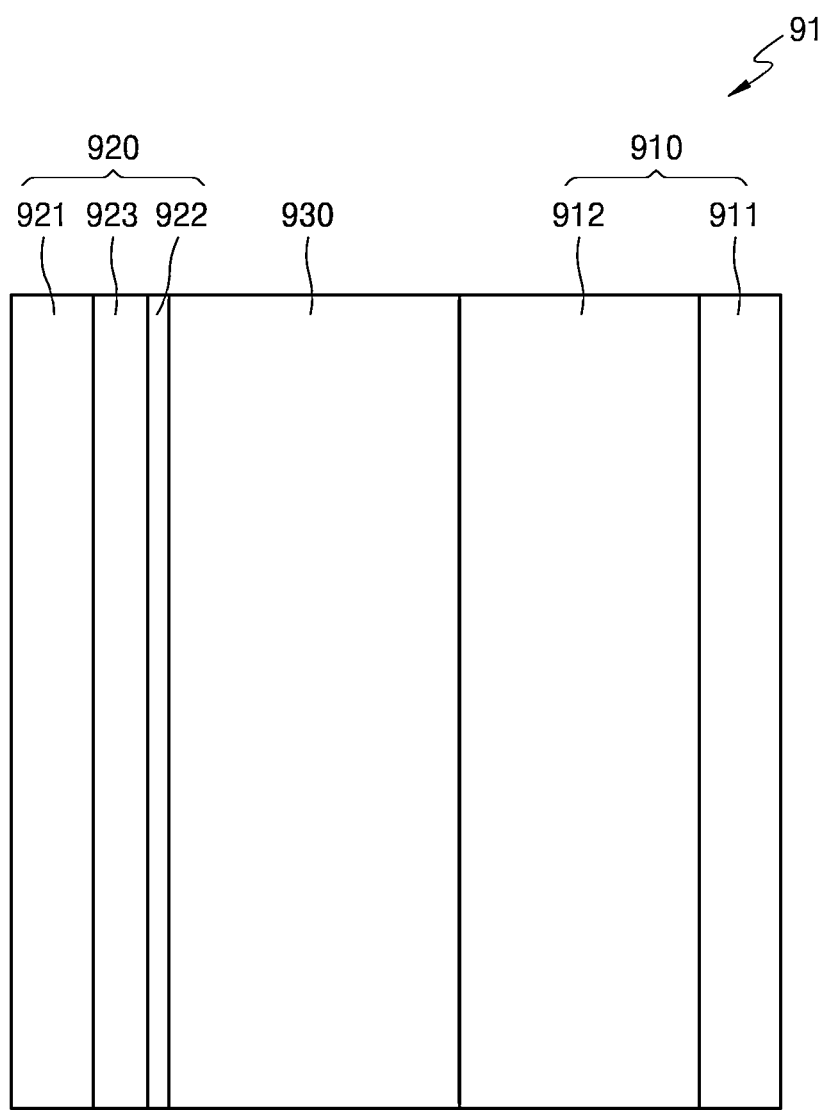
FIG. 8 is a cross-sectional view of an embodiment of an all-solid secondary battery.
Figure 9:
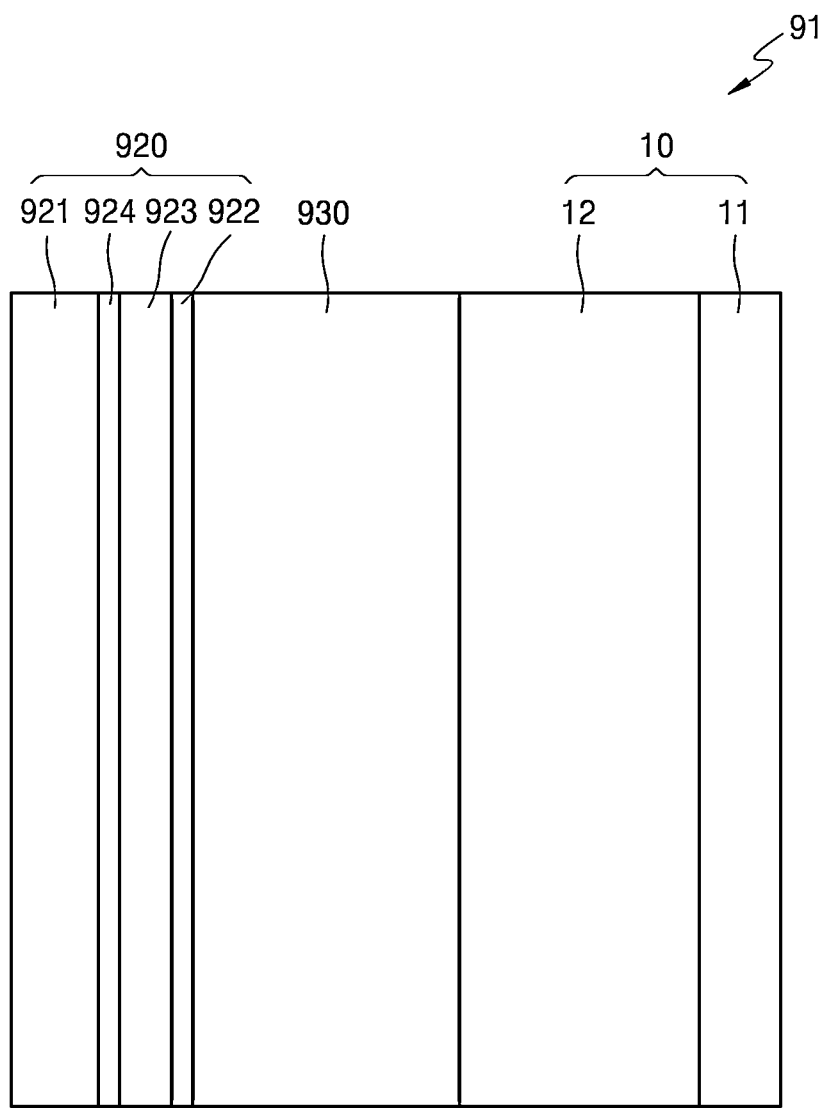
FIG. 9 is a cross-sectional view of an embodiment of an all-solid secondary battery.

The lithium battery according to an embodiment may be, for example, an all-solid battery as shown in FIG. 8 or an all-solid battery as shown in FIG. 9. In FIG. 8 and FIG. 9, a solid electrolyte is used as a liquid-impermeable ionic conductive membrane. The solid electrolyte may be, for example, an oxide-based solid electrolyte.

Referring to FIG. 8 and FIG. 9, an all-solid secondary battery 91 may include a cathode layer 910 including a cathode active material layer 912; an anode layer 920; and a solid electrolyte layer 930 that is arranged between the cathode layer 912 and the anode layer 920 and includes a solid electrolyte, wherein the anode layer 920 includes an anode current collector 921; and a first anode active material layer 923 that is arranged on the anode current collector 921. An interlayer 922 including a carbon-metal composite according to an embodiment is arranged adjacent to the solid electrolyte layer 930.

Anode Layer

Referring to FIG. 8, the first anode active material layer 923 and the interlayer 922 may be formed on the anode current collector 921.

A thickness of the interlayer 922 may be, for example, about 50% or less, about 40% or less, about 30% or less, about 20% or less, or about 10% or less of a thickness of the first anode active material layer 910. A thickness of the interlayer 922 may be, for example, about 1% or greater, about 2% or greater, or about 3% or greater of a thickness of the first anode active material layer 910 When the thickness of the interlayer 922 is less than that of the first anode active material layer 923, energy density of the all-solid secondary battery 91 may improve. The thickness of the interlayer 923 may be, for example, in a range of about 10 nm to about 10 μm, about 100 nm to about 10 μm, about 300 nm to about 10 μm, about 500 nm to about 10 μm, about 1 μm to about 10 μm, about 1 μm to about 9 μm, or about 3 μm to about 7 μm. When the thickness of the interlayer 923 is within the disclosed ranges, a short-circuit in the all-solid secondary battery 91 may be suppressed, cycle characteristics and energy density of the all-solid secondary battery 91 may be improved, and internal resistance of the all-solid secondary battery 91 by the interlayer 922 may be reduced, which may improve cycle characteristics of the all-solid secondary battery 91.

A thickness of the first anode active material 923 may be, for example, in a range of about 1 μm to about 50 μm, about 5 Ξm to about 45 μm, about 10 μm to about 40 μm, about 15 μm to about 35 μm, or about 20 μm to about 30 μm. When the thickness of the first anode active material 923 is within the disclosed ranges, a short-circuit in the all-solid secondary battery 91 is suppressed, and cycle characteristics of the all-solid secondary battery 91 may be improved. When the thickness of the first anode active material 923 is within the disclosed ranges, lithium dendrites formed between the interlayer 923 and the anode current collector 921 may collapse the first anode active material layer 923, and cycle characteristics of the all-solid secondary battery 91 may not be improved. When the thickness of the first anode active material 923 is within the disclosed ranges, energy density and cycle characteristics of the all-solid secondary battery 91 may be improved.

The first anode active material layer 923 may be a metal layer including lithium or a lithium alloy, and the metal layer may include lithium or a lithium alloy. The first anode active material layer 923 may be a metal layer including lithium, and the first anode active material layer 923 may serve, for example, as a lithium reservoir. The lithium alloy may be, for example, a Li—Cu alloy, a Li—Al alloy, a Li—Sn alloy, a Li—In alloy, a Li—Ag alloy, a Li—Au alloy, a Li—Zn alloy, a Li—Ge alloy, or a Li—Si alloy.

The first anode active material layer 923 may not be present during assembly of the all-solid secondary battery 91 and may be a lithium precipitation layer that is precipitated between the anode current collector 921 and the interlayer 922 after assembling and charging the all-solid secondary battery 91.

When the first anode active material layer 923 is arranged by charging after assembly of the all-solid secondary battery 91, the all-solid secondary battery 91 does not include the first anode active material layer 923 during the assembly of the all-solid secondary battery 91, and thus energy density of the all-solid secondary battery 91 may be increased. For example, when the all-solid secondary battery 91 is charged, the all-solid secondary battery 91 may be charged over a charge capacity of the interlayer 922. That is, the first anode active material layer 923 may be overcharged. In an early charging stage, lithium may be absorbed in the interlayer 922. That is, an anode active material in the interlayer 922 may form an alloy or a compound with lithium ions migrated from the cathode layer 910. For example, a material in the interlayer 922 may include, e.g., consist of, a material that forms an alloy or a compound with lithium, lithium metal may be precipitated between the anode current collector 921 and the interlayer 922, and a metal layer may be formed by lithium (i.e., lithium metal) corresponding to the first anode active material layer 923 by the precipitated lithium. During discharge, lithium of the first anode active material layer 923 and the interlayer 922, i.e., metal layer, may be ionized and move toward the cathode layer 910, and lithium may be used as an anode active material in the all-solid secondary battery 91. The interlayer 922 may cover the first anode active material layer 923, the first anode active material layer 923 may simultaneously serve as a protective layer for the metal layer and suppress the precipitation-growth of lithium dendrites, a short-circuit and a decrease in capacity may be suppressed in the all-solid secondary battery 91, and improving cycle characteristics of the all-solid secondary battery 91 may be improved. When the first anode active material layer 923 is formed by charging after assembling the all-solid secondary battery 91, the anode current collector 921, the interlayer 922, and a region therebetween may be Li-free regions not including lithium in an early stage or after discharging of the all-solid secondary battery 91.

The first anode active material layer 923 may include an anode active material. A carbonaceous anode active material may be included as the anode active material. The carbonaceous anode active material may include, for example, amorphous carbon, crystalline carbon, or a combination thereof.

The amorphous carbon may include a vapor grown carbon fiber ("VGCF"), activated furnace black, carbon black ("CB"), acetylene black ("AB"), Ketjen black ("KB"), a carbon nanofiber, or a combination thereof, and the crystalline carbon may include natural graphite, artificial graphite, a carbon nanotube ("CNT"), graphene, or a combination thereof.

The amorphous carbon and the crystalline carbon are not limited thereto. Any suitable amorphous carbon or crystalline carbon material may be used.

The first anode active material layer 923 may further include a metal in addition to a carbonaceous anode active material. When the first anode active material layer 923 includes a carbonaceous anode active material and a metal, the first anode active material layer 923 may include a mixture of a carbonaceous anode active material and a metal or a composite of a carbonaceous anode active material and a metal.

The carbonaceous anode active material may be, for example, amorphous carbon.

A composite of a carbonaceous anode active material and a second metal may be, for example, a composite of amorphous carbon and silver, wherein a mixing weight ratio of carbon and silver may be in a range of about 10:1 to about 1:2, about 5:1 to about 1:1, or about 4:1 to about 2:1.

When the first anode active material layer 923 further includes a metal in addition to a carbonaceous anode active material, a region between the anode current collector 921 and the first anode active material layer 923, a region between the first anode active material layer 923 and the interlayer 922, or a combination thereof may be a Li-free region that does not include lithium (Li) in an early stage or after discharging of the all-solid secondary battery 91 or may have a lithium precipitation layer after charging of the all-solid secondary battery 91. The lithium precipitation layer is a metal layer including lithium.

The anode current collector 921 may be formed of a material that does react with lithium to form an alloy or a compound. Examples of the material of the anode electrode current collector 921 may be copper (Cu), stainless steel, titanium (Ti), iron (Fe), cobalt (Co), or nickel (Ni). Any suitable electrode current collector material may be used. The anode current collector 921 may be formed of a metal or an alloy or a coating material of at least two metals. The anode current collector 921 may be, for example, in the form of a plate or a foil.

The first anode active material layer 923 may further include additives such as a filler, a dispersant, and an ionic conducting agent used in an all-solid secondary battery.

As shown in FIG. 9, the all-solid secondary battery 91 may further include a thin film 924 between the anode current collector 921 and the first anode active material layer 923, the thin film 924 including an element alloyable with lithium. The thin film 924 may be provided between the anode current collector 921 and the first anode active material layer 923. The thin film 924 may include, for example, an element alloyable with lithium. Examples of the element alloyable with lithium may be copper, gold, silver, zinc, tin, indium, silicon, aluminum, and bismuth, but are not limited thereto. Any suitable element alloyable with lithium may be used. The thin film 924 may be formed of a disclosed metal or alloy of various metals. When the thin film 924 is provided on the anode current collector 921, for example, a precipitation form of the second anode active material layer (not shown) precipitated between the thin film 924 and the first anode active material layer 923 may further be planarized, and cycle characteristics of the all-solid secondary battery 91 may further be improved.

A thickness of the thin film 924 may be, for example, in a range of about 1 nm to about 800 nm, about 10 nm to about 700 nm, about 50 nm to about 600 nm, or about 100 nm to about 500 nm. When the thickness of the thin film 924 is less than about 1 nm, a function by the thin film 24 may not be exhibited. When the thickness of the thin film 924 is within the disclosed ranges, energy density and cycle characteristics of the all-solid secondary battery 91 may be improved. The thin film 924 may be provided on the anode current collector 921, for example, by vacuum vapor deposition, sputtering, or plating, but are not limited thereto. Any suitable method capable of forming a thin film may be used.

Solid Electrolyte Layer

Referring to FIG. 8 and FIG. 9, the solid electrolyte layer 930 includes a solid electrolyte arranged between the cathode layer 910 and the anode layer 920.

The solid electrolyte may be manufactured by sintering.

The solid electrolyte may be an oxide-based solid electrolyte as described herein. In an embodiment, the solid electrolyte may be, for example, a sulfide-based solid electrolyte. The sulfide-based solid electrolyte may be, for example, $Li_2S$—$P_2S_5$, $Li_2S$—$P_2S_5$—LiX (wherein X is a halogen), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (wherein m and n are each a positive number, and Z is one of Ge, Zn, and Ga), $Li_2S$—$GeS_2$, $Li_2S$—$SiS_2$—$Li_3PO_4$, $Li_2S$—$SiS_2$—$Li_pMO_q$ (wherein p and q are each a positive number, and M is one of P, Si, Ge, B, Al, Ga, and In), $Li_{7-x}PS_{6-x}Cl_x$ (wherein $0 \leq x \leq 2$), $Li_{7-x}PS_{6-x}Br_x$ (wherein $0 \leq x \leq 2$), $Li_{7-x}PS_{6-x}I_x$ (wherein $0 \leq x \leq 2$), or a combination thereof. The sulfide-based solid electrolyte may be prepared by, for example, melting and quenching or mechanical milling starting materials (e.g., $Li_2S$ or $P_2S_5$). Subsequently, the resultant melted and quenched or mechanically milled materials may be heat-treated. The sulfide-based solid electrolyte may be amorphous, crystalline, or a mixed form thereof.

In an embodiment, the sulfide-based solid electrolyte may include sulfur (S), phosphorus (P), and lithium (Li), as component elements. For example, the sulfide-based solid electrolyte may be a material including $Li_2S$—$P_2S_5$. When the material including $Li_2S$—$P_2S_5$ is used as a sulfide-based solid electrolyte material, a mixing molar ratio of $Li_2S$ and $P_2S_5$ ($Li_2S:P_2S_5$) may be, for example, in a range of about 50:50 to about 90:10, for example, about 20:10 to about 80:10 or about 30:10 to about 70:10.

The sulfide-based solid electrolyte may include, for example, an argyrodite-type compound including $Li_{7-x}PS_{6-x}Cl_x$ (wherein $0 \leq x \leq 2$), $Li_{7-x}PS_{6-x}Br_x$ (wherein $0 \leq x \leq 2$), $Li_{7-x}PS_{6-x}I_x$ (wherein $0 \leq x \leq 2$), or a combination thereof. For example, the sulfide-based solid electrolyte in the solid electrolyte may be an argyrodite-type compound including $Li_6PS_5Cl$, $Li_6PS_5Br$, $Li_6PS_5I$, or a combination thereof.

The solid electrolyte layer 930 may, for example, include a binder. The binder in the solid electrolyte layer 930 may be, for example, styrene butadiene rubber ("SBR"), polytetrafluoroethylene, polyvinylidene fluoride, or polyethylene. Any suitable binder material may be used. The binder of the solid electrolyte layer 930 may be identical to or different from a binder of the cathode active material layer 912 and the anode active material layer 922.

Cathode Layer

The cathode layer 910 may include a cathode current collector 911 and the cathode active material layer 912.

The cathode current collector 911 may be a plate or a foil formed of, for example, indium (In), magnesium (Mg), stainless steel, titanium (Ti), iron (Fe), cobalt (Co), nickel (Ni), zinc (Zn), aluminum (Al), germanium (Ge), or an alloy thereof. The cathode current collector 911 may be omitted.

The cathode current collector 911 may include, for example, a cathode active material. The cathode active material may be capable of reversibly absorbing and desorbing lithium ions. The cathode active material may be, for example, a lithium transition metal oxide such as a lithium cobalt oxide ("LCO"), a lithium nickel oxide, a lithium nickel cobalt oxide, a lithium nickel cobalt aluminum oxide ("NCA"), a lithium nickel cobalt manganese oxide ("NCM"), a lithium manganate, or a lithium iron phosphate; a nickel sulfide; a copper sulfide; a lithium sulfide; an iron oxide; or a vanadium oxide. Any suitable cathode active material may be used. Two different cathode active materials may be used.

The lithium transition metal oxide may be, for example, a compound represented by one of the following formulae: $Li_aA_{1-b}B'_bD_2$ (wherein $0.90 \leq a \leq 1$ and $0 \leq b \leq 0.5$); $Li_aE_{1-b}B'_bO_{2-c}D_c$ (wherein $0.90 \leq a \leq 1$, $0 \leq b \leq 0.5$, and $0 \leq c \leq 0.05$); $LiE_{2-b}B'_bO_{4-c}D_c$ (wherein $0 \leq b \leq 0.5$ and $0 \leq c \leq 0.05$); $Li_aNi_{1-b-c}Co_bB'_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_bE_cG_dO_2$ (wherein $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1$ and $0.001 \leq b \leq 0.1$); $Li_aCoG_bO_2$ (wherein $0.90 \leq a \leq 1$ and $0.001 \leq b \leq 0.1$); $Li_aMnG_bO_2$ (wherein $0.90 \leq a \leq 1$ and $0.001 \leq b \leq 0.1$); $Li_aMn_2G_bO_4$ (wherein $0.90 \leq a \leq 1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); or $LiFePO_4$.

In the compound, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G may be (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

The compounds may have a surface coating layer (hereinafter, also referred to as "coating layer"). A mixture of a disclosed compound without a coating layer and a disclosed compound having a coating layer may be used. In an embodiment, the coating layer may include oxide, hydroxide, oxyhydroxide, oxycarbonate, hydroxycarbonate, or a combination thereof as a compound of the coating element. In an embodiment, the compounds for the coating layer may be amorphous or crystalline. In an embodiment, the coating element in the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof. In an embodiment, the coating layer may be formed using any suitable method that does not adversely affect the physical properties of the cathode active material. For example, the coating layer may be formed using a spray coating method or a dipping method.

The cathode active material may include, for example, a lithium salt of a transition metal oxide that has a layered rock-salt type structure among the examples of the lithium transition metal oxide. For example, the "layered rock-salt type structure" refers to a structure in which an oxygen atom layer and a metal atom layer are alternately and regularly arranged in a <111> direction in a cubic rock-salt type structure, where each of the atom layers forms a two-dimensional flat plane. The "cubic rock-salt type structure" refers to a sodium chloride (NaCl) type structure, which is one of the crystalline structures, for example, to a structure in which face-centered cubic ("fcc") lattices respectively formed of anions and cations are shifted by only a half of the ridge of each unit lattice. Examples of the lithium transition metal oxide having the layered rock-salt type structure may include a ternary lithium transition metal oxide expressed as $LiNi_xCo_yAl_zO_2$ ("NCA") or $LiNi_xCo_yMn_zO_2$ ("NCM") (wherein $0 < x < 1$, $0 < y < 1$, $0 < z < 1$, and $x + y + z = 1$). When the cathode active material includes a ternary transition metal oxide having the layered rock-salt type structure, energy density and thermal stability of the all-solid secondary battery 91 may be improved.

The cathode active material may be covered by a coating layer as described herein. The coating layer is any suitable material that may be used as a coating layer of a cathode active material of an all-solid secondary battery. The coating layer may be, for example, $Li_2O-ZrO_2$.

When the cathode active material includes nickel (Ni) as a ternary lithium transition metal oxide such as NCA or NCM, a capacity density of the all-solid secondary battery 91 may increase, metal elution from the cathode active material in a charged state may be reduced, and the all-solid secondary battery 91 according to an embodiment may have improved cycle characteristics in a charged state.

A shape of the cathode active material may be, for example, particle shapes such as a true spherical shape, an elliptical shape, or a spherical shape. A particle diameter of the cathode active material is not particularly limited but may be in a range applicable to a cathode active material of an all-solid secondary battery. An amount of the cathode active material of the cathode layer 910 is not particularly limited and may be in a range applicable to a cathode layer of an all-solid secondary battery.

The cathode layer 910 may further include, for example, additives such as a filler, a dispersant, and an ionic conducting agent in addition to the cathode active material described herein. The conducting agent may be, for example, graphite, carbon black, acetylene black, Ketjen black, a carbon fiber, a carbon tube, e.g., a carbon nanotube, or metal powder. Examples of the binder may include styrene butadiene rubber ("SBR"), polytetrafluoroethylene, polyvinylidene fluoride, and polyethylene. The filler, dispersant, and ionic conducting agent that may be included in the cathode layer 910 may be any material suitable for use in an electrode of an all-solid secondary battery.

The cathode layer 910 may further include a solid electrolyte. The solid electrolyte in the cathode layer 910 may be similar to or different from the solid electrolyte in the solid electrolyte layer 930. Details of the solid electrolyte are the same as defined with reference to the description about the solid electrolyte layer 930.

The solid electrolyte in the cathode layer 910 may be, for example, an oxide-based solid electrolyte or a sulfide-based solid electrolyte. In an embodiment, the cathode layer 910 may be impregnated in, for example, a liquid electrolyte. The liquid electrolyte may include a lithium salt and an ionic liquid, a polymer ionic liquid, or a combination thereof. The liquid electrolyte may be non-volatile. The ionic liquid refers to a salt in a liquid state at room temperature or a room temperature molten salt that has a melting point of room temperature or lower and is only formed of ions. The ionic liquid may be a compound including a) a cation of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazolium-based cation, or a combination thereof; and b) an anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^-$, $CF_3SO_3^-$, $(FSO_2)_2N^-$, $(C_2F_5SO_2)_2N^-$, $(C_2F_5SO_2)(CF_3SO_2)N^-$, $(CF_3SO_2)_2N^-$, $(FSO_2)(CF_3SO_2)N^-$, or a combination thereof. The ionic liquid may be, for example, N-methyl-N-propylpyrrolidinium bis(trifluoromethanesulfonyl)imide, N-butyl-N-methylpyrrolidinium bis(3-trifluoromethylsulfonyl)imide, 1-butyl-3-methylimidazolium bis(trifluoromethylsulfonyl)imide, 1-ethyl-3-methylimidazolium bis(trifluoromethylsulfonyl)imide, or a combination thereof. The polymer ionic liquid may have a repeating unit including a) a cation of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazolium-based cation, or a combination thereof; and b) an anion $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $(FSO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof.

The lithium salt may be any suitable lithium salt material. The lithium salt may be, for example, $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $Li(FSO_2)(CF_3SO_2)N$, $LiC_4F_9SO_3$, $LiAlO_2$, $LiAlCl_4$, $LiN(C_xF_{2x+1}SO2)(C_yF_{2y+1}SO_2)$ (wherein x and y are each a natural number), LiCl, LiI, or a combination thereof. A concentration of the lithium salt in the liquid electrolyte may be, for example, in a range of about 0.1 M to about 5 M, for example, about 0.5 M to about 4 M or about 1 M to about 3 M. An amount of the liquid electrolyte in the cathode layer 910 may be, for example, in a range of about 0 parts to about 100 parts by weight, about 0 parts to about 30 parts by weight, about 0 parts to about 10 parts by weight, or about 0 parts to about 5 parts by weight, based on 100 parts by weight of the cathode active material layer 912 not including the liquid electrolyte.

The all-solid secondary battery 91 may be prepared by, for example, separately preparing each of the solid electrolyte layer 930, on which the interlayer 922 and the first anode active material layer 923 are sequentially stacked, and the cathode layer 910, and then stacking the layers.

Preparation of Cathode Layer

Materials constituting the cathode active material layer 912 such as a cathode active material layer and a binder may be added to a non-polar solvent to prepare a slurry. The slurry may be coated and dried on the cathode current collector 911. An obtained stack may be pressed to prepare a cathode layer 910. The pressing process may be omitted. When the pressing process is performed, the pressing process may be performed by, for example, roll pressing, flat pressing, or isostatic pressing. A mixture of the materials constituting the cathode active material layer 912 may be compressed into the form of a pellet or stretched (molded) in the form of sheet to prepare the cathode layer 910. When the cathode layer 910 is prepared in this manner, the cathode current collector 911 may be omitted. In an embodiment, the cathode layer 910 may be used as impregnated in the liquid electrolyte described herein.

Preparation of All-Solid Secondary Battery

The cathode layer 910, the anode layer 920, the interlayer 922, and the solid electrolyte layer 930 prepared as described herein may be stacked such that the cathode layer 910 and the anode layer 920 has the solid electrolyte layer 930 therebetween to prepare a stack, and the stack may be pressed to prepare an all-solid secondary battery 91.

The pressing process may be omitted or may be performed. The pressing process may be, for example, roll pressing, flat pressing, or isostatic pressing. A pressure applied in the pressing process may be in a range of about 50 megapascals (MPa) to about 750 MPa, for example, about 100 MPa to about 700 MPa or about 150 MPa to about 600 MPa. A time for the pressing process may be in a range of about 5 milliseconds (ms) to about 5 minutes (min), for example, about 100 ms to about 4.5 min or about 1,000 ms to about 4 min. The pressing process may be performed at a temperature, for example, in a range of room temperature to about 90° C. or about 20° C. to about 90° C. In an embodiment, the pressing process may be performed at a high temperature of about 100° C. or higher, for example, about 100° C. to about 500° C. or about 150° C. to about 400° C. Elements of the composition and processes of a preparation method of the all-solid secondary battery 91 may be appropriately modified. The pressing may be omitted.

One or more embodiments will now be described in more detail with reference to the following examples. However, these examples are not intended to limit the scope of the one or more embodiments.

EXAMPLES

Preparation of Interlayer Including Silver-Carbon Composite and Preparation of Lithium Battery Including the Interlayer Example 1

An amount of 1.9 grams (g) of silver methanesulfonate ($AgSO_3CH_3$, molecular weight (M.W.) 202.93, Aldrich) was dissolved in a mixture including ethanol and $H_2O$ (1:1 volume ratio (v/v)), 3 g of carbon black (CB-35, Asahi Co.) (median diameter (D50): 32 nanometers (nm)) was added thereto, and the resultant mixture was stirred for about 2 hours to prepare a composition for an interlayer.

The composition for an interlayer was dried at a temperature of about 40° C. for 12 hours and about 80° C. for 2 hours. A powder obtained by the drying process was collected and moved to an aluminum crucible. In the aluminum crucible, the powder was heat-treated in an argon gas at a temperature of about 300° C. with a temperature increase rate of about 1 degree Celsius per minute (° C./min) for 2 hours, and then the powder was second heat-treated at a temperature of about 600° C. with a temperature increase rate of about 1° C./min for 2 hours to obtain a silver-carbon composite, Ag(Ag$_2$S)@C. In the silver-carbon composite, an amount of silver was about 24.5 weight % (wt %), an amount of silver sulfide was about 0.5 wt %, and an amount of carbon black, which is a carbonaceous material, was about 75.0 wt %. In the silver-carbon composite, an average particle diameter of silver was about 38 nm, and an average particle diameter of silver sulfide was about 2 nm or less.

The silver-carbon composite and polyvinyl alcohol ("PVA")-g-polyacrylic acid ("PAA") as a water-soluble binder were put into a mixer (AR-100, available from Thinky Corporation), water was slowly added thereto, and the resultant mixture was stirred to prepare a slurry. The slurry was coated on an acid-pretreated Li$_{6.5}$La$_3$Zr$_{1.5}$Ta$_{0.3}$O$_{12}$ ("T-LLZO") pellet available from Toshima Co.) having a thickness of about 14 micrometers (μm), as a liquid-impermeable ion-conductive membrane, using a tape casting method. Subsequently the coated product was dried in the air at a temperature of about 20° C. for 10 minutes and then vacuum-dried at a temperature of about 80° C. for 10 minutes to prepare an interlayer including a silver-carbon composite (Ag(Ag$_2$S)@C) on the liquid-impermeable ion-conductive membrane (T-LLZO membrane). A thickness of the interlayer was about 14 μm. In the final interlayer, an amount of the silver-carbon composite, Ag(Ag$_2$S)@C was about 93 wt %, and an amount of the binder, PVA-g-PAA, was about 7 wt %.

The acid-pretreated T-LLZO pellet used as a liquid-impermeable ion-conductive membrane (T-LLZO membrane) was obtained according to the following process.

Two surfaces of a T-LLZO pellet were first mechanically polished using a SiC sandpaper for 1 minute, and then acid-treated using a 1 molar (moles per liter (M)) HCl aqueous solution for 10 minutes. Then, the resultant pellet was washed with ethanol and air dried in a dry room (a dew point: −50° C.) to prepare an acid-pretreated T-LLZO pellet having increased surface roughness.

A current collector (20 micrometers (μm)) of LiCu foil, available from Honjo Co., Japan) was arranged on the interlayer arranged on the liquid-impermeable ion-conductive membrane (T-LLZO membrane) to prepare a stack, and the stack was pressed at a pressure of about 250 megapascals (MPa) for 3 minutes using cold isostatic pressing ("CIP") to prepare a T-LLZO membrane/interlayer/LiCu thin film structure.

Separately, a cathode was prepared as follows.

LiNi$_{0.33}$Co$_{0.33}$Mn$_{0.33}$O$_2$ ("NCM111") as a cathode active material, polytetrafluoroethylene (a polyvinylidene Fluoride (PVDF) binder manufactured by DuPont), and carbon nanofiber (Cabot) were mixed in synthetic fine graphite (SFG6), to obtain a mixture. In the mixture, a mixing weight ratio of NCM111:Cabot:SFG6:PVDF was about 93:3:1:3.

The mixture was stretched in the form of a sheet to prepare a cathode active material sheet.

The cathode active material sheet was pressed on a cathode current collector formed of an aluminum foil having a thickness of about 12 μm to prepare a cathode layer. In the cathode layer, a loading level was about 41.18 milligrams per square centimeter (mg/cm$^2$), and a specific density was about 3.2 grams per cubic centimeter (g/cm$^3$). The cathode active material sheet was impregnated in a cathode electrolyte having 2.0 M of bis(trifluoromethanesulfonyl)imide ("LiFSI") dissolved in an ionic liquid, N-propyl-N-methyl-pyrrolidinium bis(fluorosulfonyl)imide ("Pyr$_{13}$FSI").

The resultant structure was arranged on the LLZO membrane of the LLZO membrane/interlayer/LiCu thin film structure to prepare a lithium battery.

The cathode electrolyte was prepared by mixing N-methyl-N-propylpyrrolidinium bis(trifluoromethanesulfonyl)imide ("PYR13TFSI") as an ionic liquid and lithium bis(trifluoromethanesulfonyl)imide ("LiTFSI") as a lithium salt and stirring the mixture at room temperature (25° C.), wherein a mixing weight ratio of PYR13TFSI as an ionic liquid and LiTFSI as a lithium salt was about 10:100.

Example 2

An interlayer and a lithium battery including the same were prepared in the same manner as in Example 1, except that a silver-carbon composite prepared as follows was used instead of the silver-carbon composite in Example 1.

An amount of 2.40 g of silver trifluoromethanesulfonate (AgSO$_3$CF$_3$, M.W. 256.94, Aldrich) was dissolved in a mixture including dimethoxymethane and water, 3 g of carbon black (CB-35, Asahi Co.) (D50: 32 nm) was added thereto, and the resultant mixture was stirred for about 1 hour to prepare a composition for an interlayer, and the composition was dried at a temperature of about 40° C. for 12 hours and about 80° C. for 2 hours to obtain a powder. In the mixture of dimethoxymethane and water, a volume ratio of dimethoxymethane and water was about 9:1.

The powder was collected and placed in an alumina crucible, and the powder was heat-treated in an argon gas at a temperature of about 600° C. with a temperature increase rate of about 1° C./min for 1 hour to obtain a silver-carbon composite, Ag(AgF)@C. In the silver-carbon composite, an amount of silver was about 24.8 wt %, an amount of silver fluoride was about 0.4 wt %, and an amount of a carbonaceous material was about 74.8 wt %. In the silver-carbon composite, an average particle diameter of silver was about 113 nm, and an average particle diameter of silver fluoride was about 2 nm.

An interlayer including Ag(AgF)@C on an acid-pretreated T-LLZO pellet and a lithium battery including the interlayer were prepared in the same manner as in Example 1, except that the silver-carbon composite, Ag(AgF)@C, was used instead of the silver-carbon composite, Ag(Ag$_2$S)@C, on the T-LLZO membrane.

Example 3

An interlayer and a lithium battery including the same were prepared in the same manner as in Example 1, except that a silver-carbon composite prepared as follows was used instead of the silver-carbon composite in Example 1.

An amount of 1.9 g of silver methanesulfonate (AgSO$_3$CH$_3$, M.W. 202.93, Aldrich) was dissolved in a mixture including—ethanol and H$_2$O (1:1, v/v), 3 g of carbon black (CB-35, Asahi Co.) (D50: 32 nm) was added thereto, and the resultant mixture was stirred for about 1 hour to prepare a composition for an interlayer. The composition for an interlayer was dried at a temperature of about 40° C. for 12 hours and about 80° C. for 2 hours. A powder obtained by the drying process was collected and moved to an aluminum crucible. In the aluminum crucible, the powder was heat-treated in an argon gas at a temperature of about 600° C. with a temperature increase rate of about 1° C./min for 1 hour to obtain a silver-carbon composite, Ag(Ag$_2$S) @C. In the silver-carbon composite, an amount of silver was about 24.5 weight % (wt %), an amount of silver sulfide was about 0.5 wt %, and an amount of carbon black, which is a carbonaceous material, was about 75.0 wt %. In the silver-carbon composite, an average particle diameter of silver was about 132 nm, and an average particle diameter of silver sulfide was about 2 nm or less.

Example 4

An interlayer and a lithium battery including the same were prepared in the same manner as in Example 1, except that a silver-carbon composite prepared as follows was used instead of the silver-carbon composite in Example 1.

An amount of 1.9 g of silver methanesulfonate (AgSO$_3$CH$_3$, M.W. 202.93, Aldrich) was dissolved in a mixture including methanol and H$_2$O (1:1, v/v), 3 g of carbon black (CB-35, Asahi Co.) (D50: 32 nm) was added thereto, and the resultant mixture was stirred for about 2 hours to prepare a composition for an interlayer. The composition for an interlayer was dried at a temperature of about 40° C. for 12 hours and about 80° C. for 2 hours. A powder obtained by the drying process was collected and moved to an aluminum crucible. In the aluminum crucible, the powder was heat-treated in an argon gas at a temperature of about 600° C. with a temperature increase rate of about 1° C./min for 2 hours to obtain a silver-carbon composite, Ag(Ag$_2$S) @C. In the silver-carbon composite, an amount of silver was about 24.5 weight % (wt %), an amount of silver sulfide was about 0.5 wt %, and an amount of carbon black, which is a carbonaceous material, was about 75.0 wt %. In the silver-carbon composite, an average particle diameter of silver was about 112 nm, and an average particle diameter of silver sulfide was about 2 nm or less.

Example 5

An interlayer and a lithium battery including the same were prepared in the same manner as in Example 1, except that a silver-carbon composite prepared as follows was used instead of the silver-carbon composite in Example 1.

An amount of 1.9 g of silver methanesulfonate (AgSO$_3$CH$_3$, M.W. 202.93, Aldrich) was dissolved in a mixture including ethanol and H$_2$O (1:1, v/v), 3 g of carbon black (CB-35, Asahi Co.) (D50: 32 nm) was added thereto, and the resultant mixture was stirred for about 1 hour to prepare a composition for an interlayer. The composition for an interlayer was dried at a temperature of about 40° C. for 12 hours and about 80° C. for 2 hours. A powder obtained by the drying process was collected and moved to an aluminum crucible. In the aluminum crucible, the powder was heat-treated in an argon gas at a temperature of about 600° C. with a temperature increase rate of about 1° C./min for 1 hour to obtain a silver-carbon composite, Ag(Ag$_2$S) @C. In the silver-carbon composite, an amount of silver was about 24.5 weight % (wt %), an amount of silver sulfide was about 0.5 wt %, and an amount of carbon black, which is a carbonaceous material, was about 75.0 wt %. In the silver-carbon composite, an average particle diameter of silver was about 88 nm, and an average particle diameter of silver sulfide was about 2 nm or less.

Comparative Example 1

An interlayer and a lithium battery including the same were prepared in the same manner as in Example 1, except that the interlayer was prepared as follows.

An Ag nanopowder ("NP") (D50=60 nm, Dowa Co.) and carbon black (D50=35 nm) were used to prepare an interlayer. Silver (Ag) and carbon black at a weight ratio of 1:2 were mixed to water including 7 wt % of PVA-g-PAA. Water was slowly added to the mixture in a mixer (AR-100, available from Thinky Corporation) to prepare an interlayer slurry.

The slurry was coated on an acid-treated T-LLZO pellet (Li$_{6.5}$La$_3$Zr$_{1.5}$Ta$_{0.3}$O$_{12}$, available from Toshima Co.) having a thickness of about 500 μm, using a tape casting method, and the coated product was dried in the air at a temperature of about 20° C. for 10 minutes and then dried at a temperature of about 80° C. for 10 minutes to prepare an interlayer including a silver-carbon (Ag/C) mixture and having a thickness of about 27 μm. In the interlayer, an amount of the silver-carbon (Ag/C) blend was about 93 wt %, and an amount of the binder, PVA-g-PAA, was about 7 wt %.

Comparative Example 2

An interlayer and a lithium battery including the same were prepared in the same manner as in Comparative Example 1, except that the thickness of the interlayer including the silver-carbon (Ag/C) mixture was about 14 μm instead of 27 μm.

Comparative Example 3

An interlayer and a lithium battery including the same were prepared in the same manner as in Comparative Example 1, except that the mixture weight ratio of silver and carbon black during the preparation of the interlayer slurry was changed to about 2:1 instead of 1:2, and the thickness of the interlayer including the silver-carbon (Ag/C) mixture was about 13 μm instead of 27 μm.

Evaluation Example 1: Transmission Electron Microscope ("TEM")

Figure 2A:
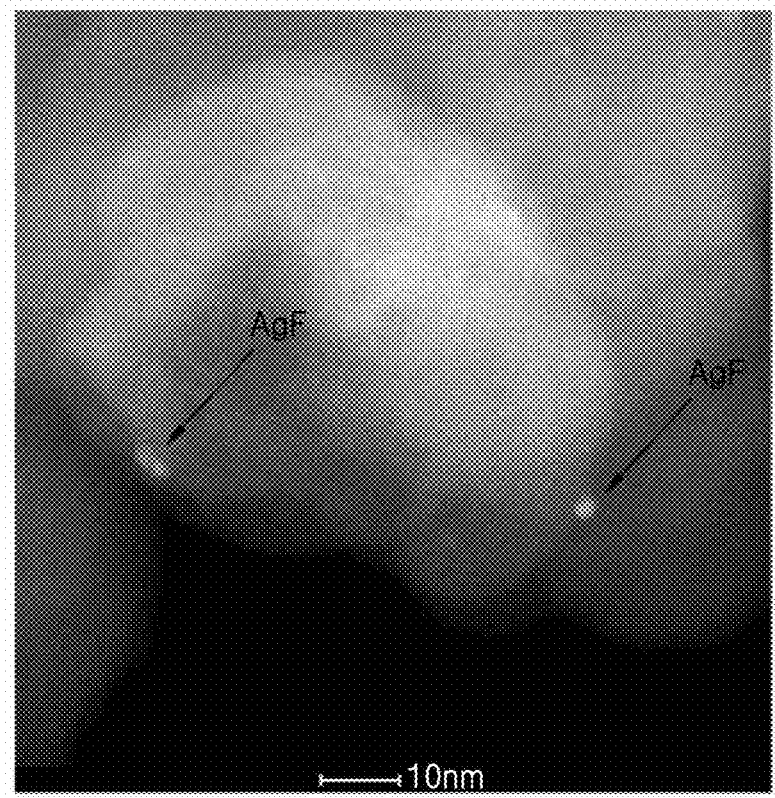
FIG. 2A is a photograph showing the results of transmission electron microscope ("TEM") analysis of a silver-carbon composite of Example 2.

The silver-carbon composite prepared in Example 2 was subjected to transmission electron microscope ("TEM") analysis, and the results are shown in FIG. 2A.

Referring to FIG. 2A, silver fluoride (AgF) existed on a surface of the silver-carbon composite of Example 2.

Evaluation Example 2: X-Ray Photoelectron Spectroscopy ("XPS") Analysis

X-ray photoelectron spectroscopy ("XPS") analysis on the silver-carbon composites prepared in Examples 2 to 5 and the silver-carbon blend of Comparative Example 1 were performed. Electron spectroscopy for chemical analysis ("ESCA") available from ULVAC-PHI, Inc. was used as the X-ray photoelectron spectrometer, and a Kα ray of aluminum was used as the X-ray source to analyze spectra of C1s, O1s, and S2p, a spectrum of Ag3d (364 to 390 electronvolts (eV)), and a spectrum of F1s (680 to 700 eV) by multiplex measurement.

Figure 2B:
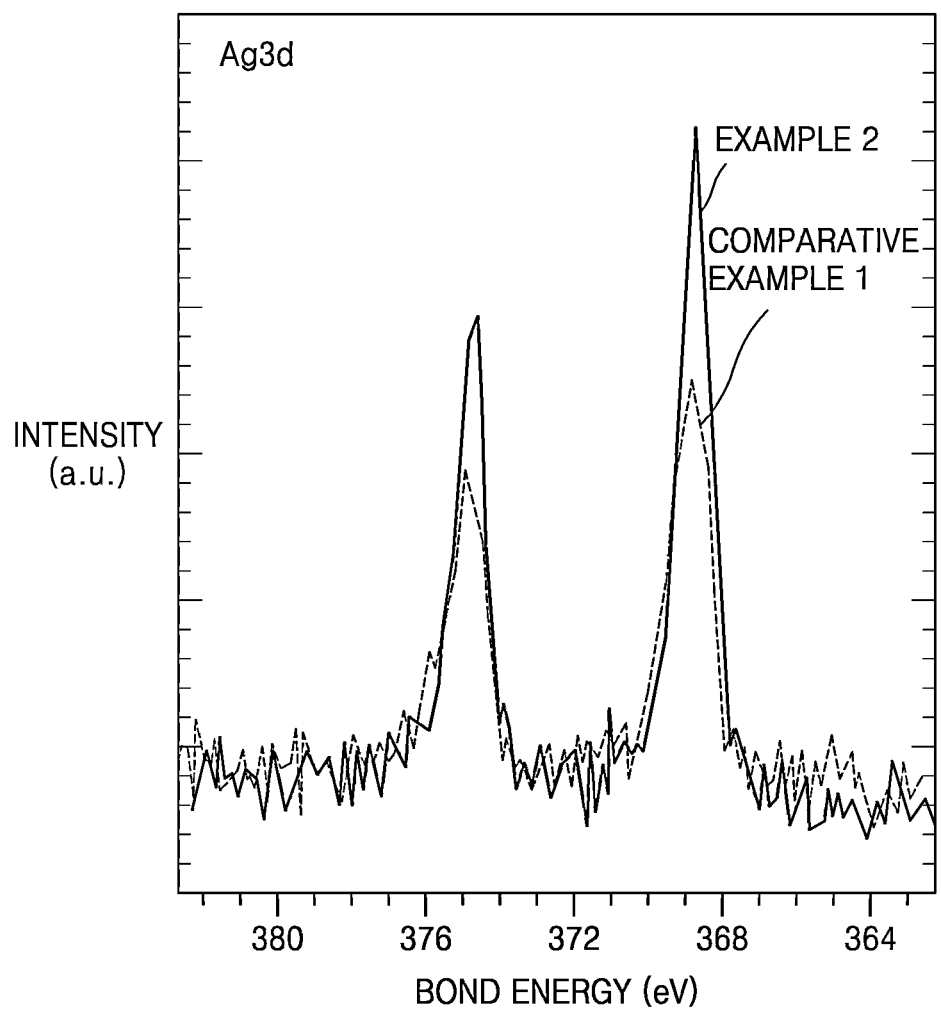
FIG. 2B is a graph of intensity (arbitrary units (a.u.)) versus bond energy (electronvolts (eV)) showing the results of X-ray photoelectron spectroscopy ("XPS") analysis of the silver-carbon composite of Example 2 and a silver-carbon blend of Comparative Example 1.
Figure 2C:
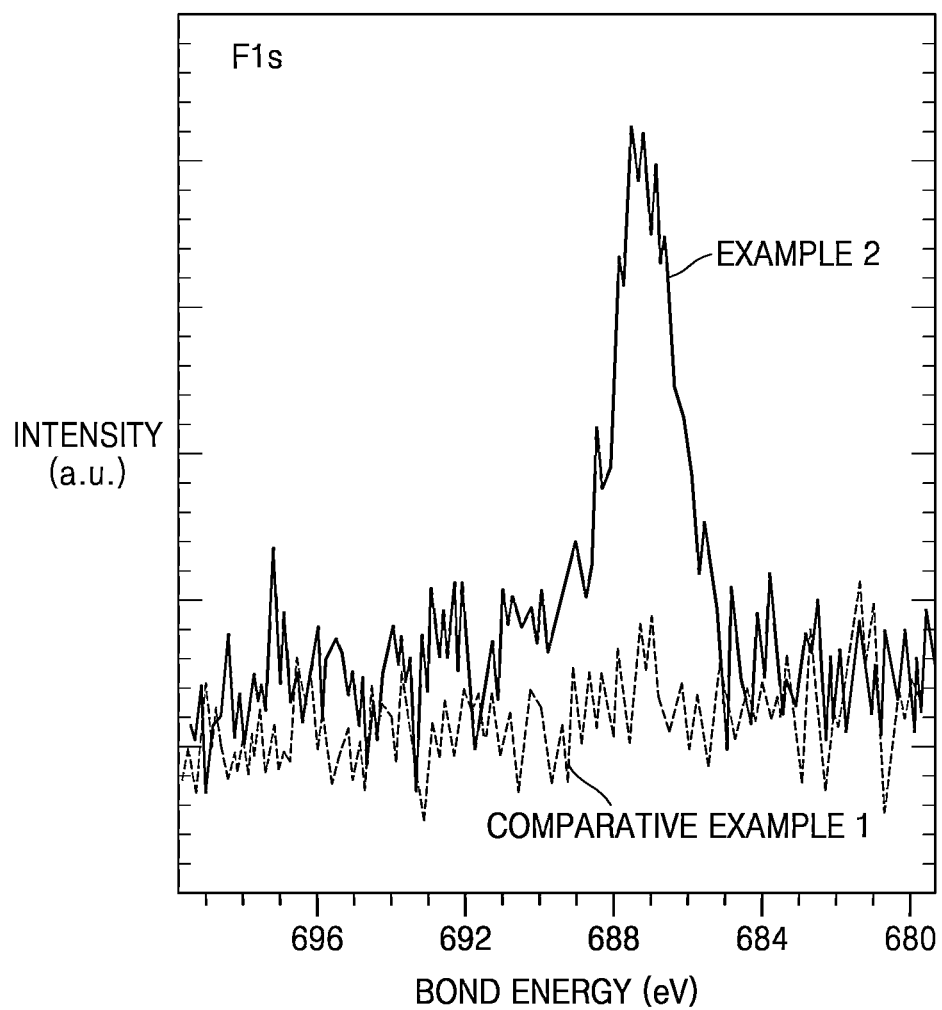
FIG. 2C is a graph of intensity (a.u.) versus bond energy (eV) showing the results of XPS analysis of the silver-carbon composite of Example 2 and a silver-carbon blend of Comparative Example 1.

Table 1 shows the results of the XPS analysis of the silver-carbon composites of Examples 2 to 5, and FIG. 2B and FIG. 2C show the results of the XPS analysis of the silver-carbon composite of Example 2 and the silver-carbon blend of Comparative Example 1. The results in Table 1 were obtained by performing argon sputtering on the silver-carbon composites and the silver-carbon blend at a voltage of 2 kV for about 1 minute.

TABLE 1

| Sample | C1s | O1s | S2p | Ag3d | F1s |
|---|---|---|---|---|---|
| Example 2 | 98.39 | 0.23 | 0.34 | 0.35 | 0.69 |
| Example 3 | 98.41 | 1.28 | 0.24 | 0.07 | — |
| Example 4 | 97.83 | 1.67 | 0.33 | 0.17 | — |
| Example 5 | 99.37 | 0.11 | 0.27 | 0.25 | — |

From Table 1, atomic surface compositions of the silver-carbon composites of each of Examples 2 to 5 may be determined. Referring to FIG. 2B and FIG. 2C, compositions of the silver-carbon composite of Example 2 and the silver-carbon blend of Comparative Example 1 may be confirmed.

Evaluation Example 3: Scanning Electron Microscope ("SEM") and Energy-Dispersive X-Ray Spectroscopy ("EDX")

FIG. 2A shows an SEM/EDX image of the interlayer including the silver-carbon composite of Example 2.

Figure 6A:
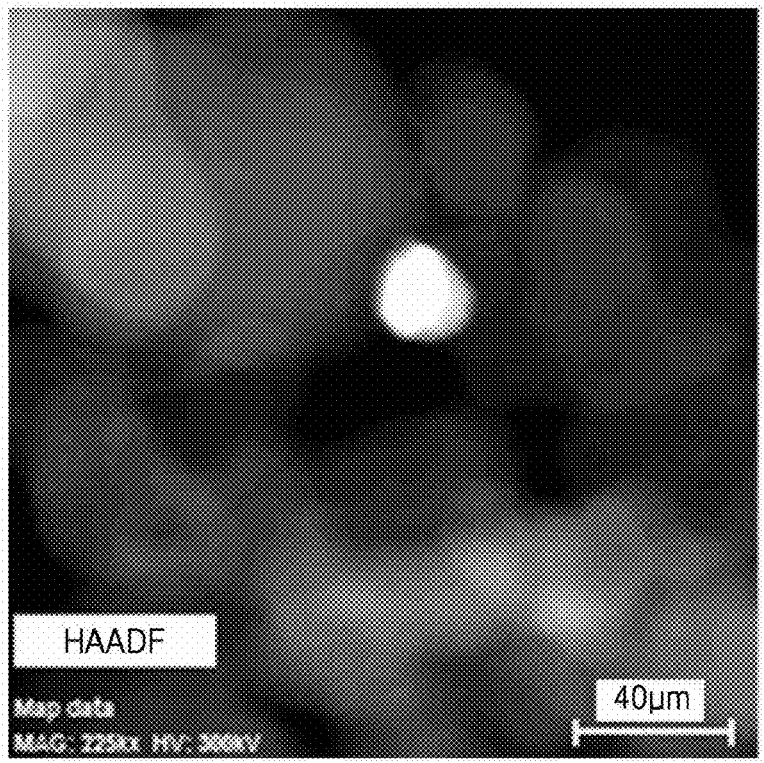
FIG. 6A is a photograph showing the results of scanning electron microscope ("SEM")/energy dispersive X-ray spectroscopy ("EDS") analysis of the silver-carbon composite of Example 2.
Figure 6B:
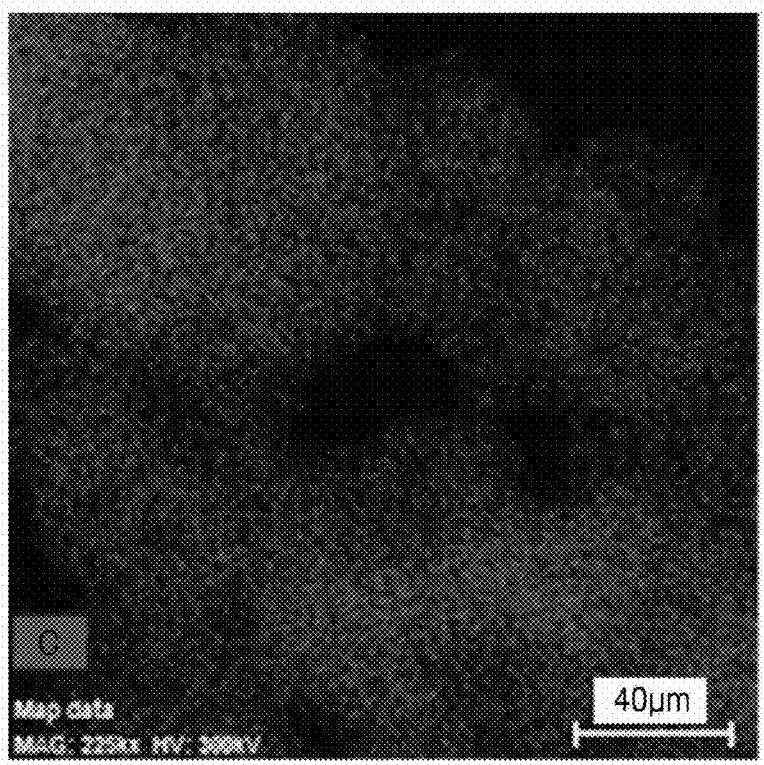
FIG. 6B is a photograph showing the results of SEM/EDS analysis of the silver-carbon composite of Example 2.
Figure 6C:
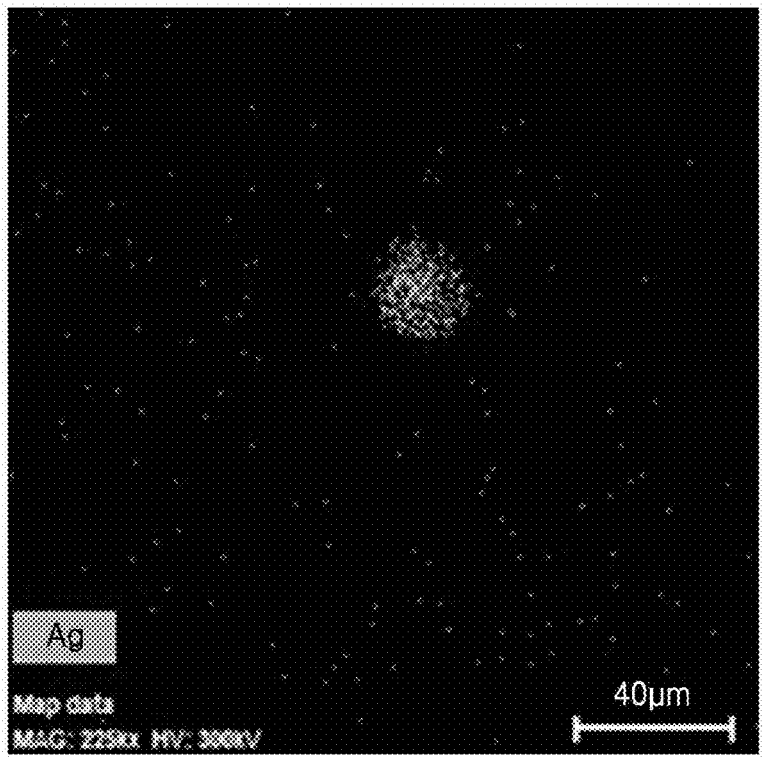
FIG. 6C is a photograph showing the results of SEM/EDS analysis of the silver-carbon composite of Example 2.
Figure 6D:
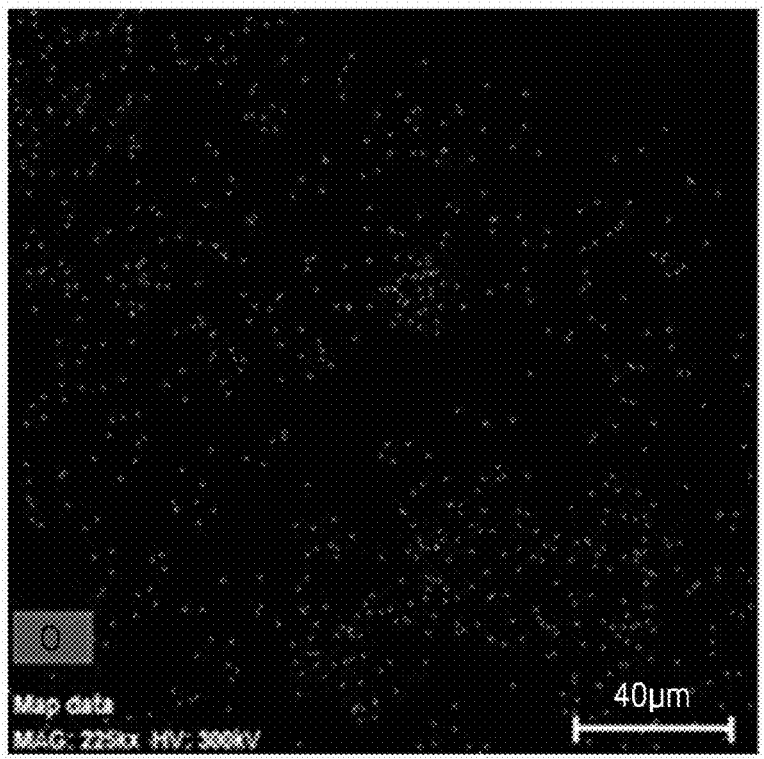
FIG. 6D is a photograph showing the results of SEM/EDS analysis of the silver-carbon composite of Example 2.
Figure 6E:
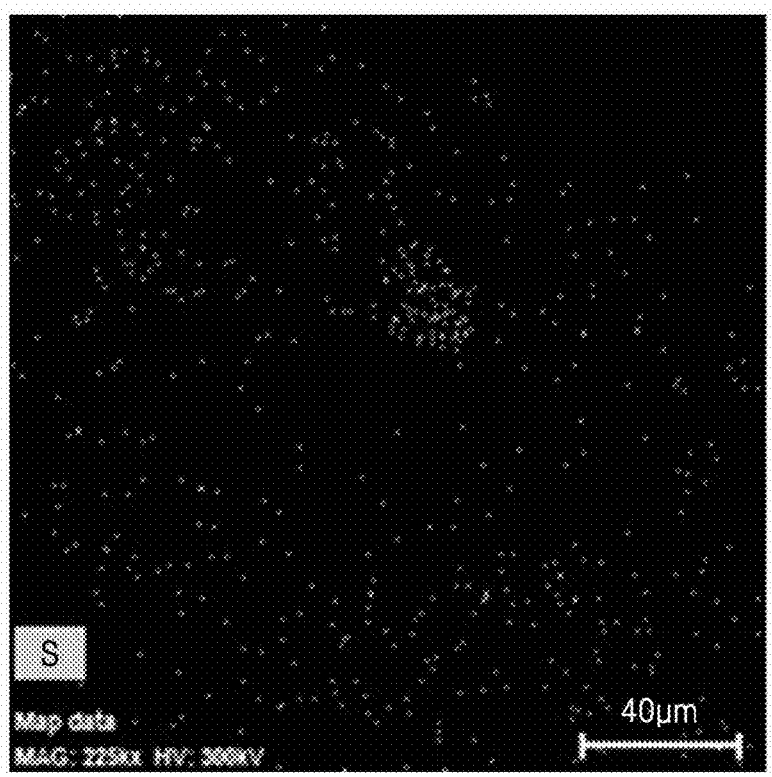
FIG. 6E is a photograph showing the results of SEM/EDS analysis of the silver-carbon composite of Example 2.
Figure 6F:
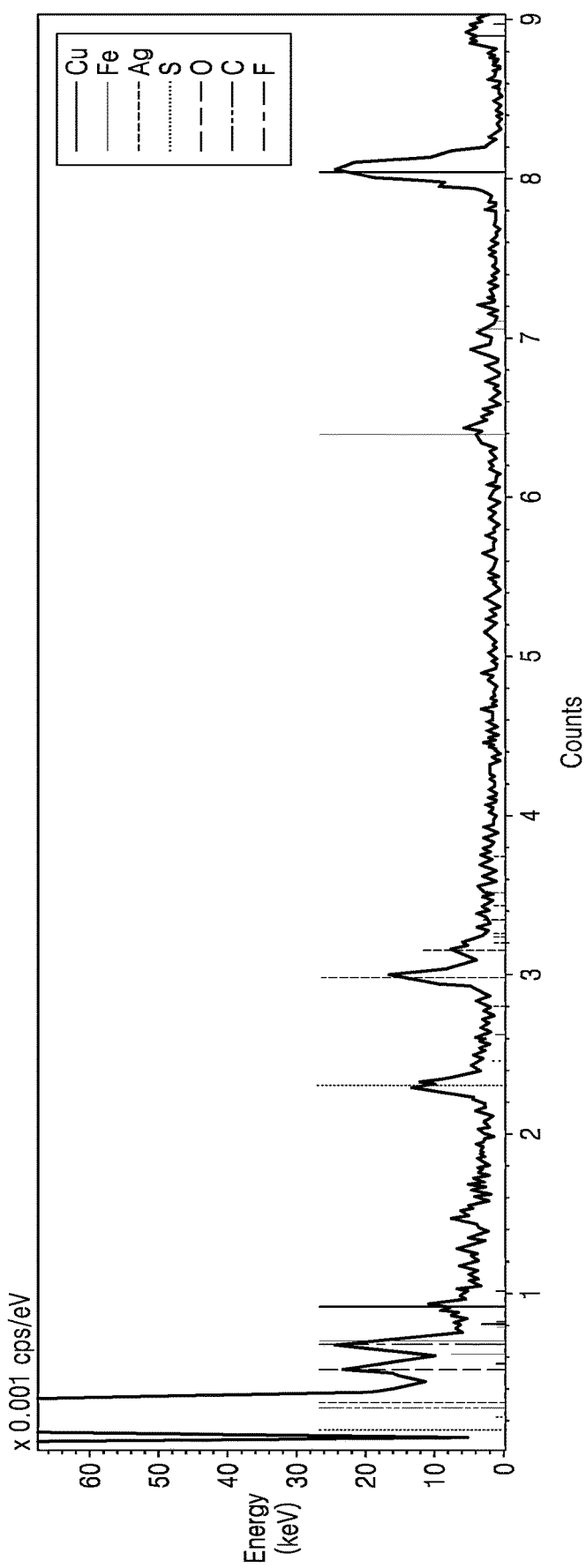
FIG. 6F is a graph of energy (kiloelectronvolts (keV)) versus counts showing the results of SEM/EDS analysis of the silver-carbon composite of Example 2.

FIG. 6A, FIG. 6B, FIG. 6C, FIG. 6D, FIG. 6E, and FIG. 6F show the results of SEM/EDX analysis of the silver-carbon composite of Example 2, wherein FIG. 6A, FIG. 6B, FIG. 6C, FIG. 6D, and FIG. 6E show mapping images of the whole, carbon, silver (Ag), oxygen, and sulfur (S), respectively, and FIG. 6F shows the EDX analysis result.

Referring to FIG. 2A, FIG. 6A, FIG. 6B, FIG. 6C, FIG. 6D, FIG. 6E, and FIG. 6F, the silver-carbon composite of Example 2 includes sulfur and fluorine.

Evaluation Example 4: Charge/Discharge Characteristics

Charge/discharge characteristics of the lithium batteries prepared in Examples 1 and 2 and Comparative Examples 1 to 3 may be evaluated as follows. The charge/discharge characteristics evaluation was performed in a thermostat container of 25° C.

In the $1^{st}$ cycle, each of the lithium batteries was charged with a constant current of about 0.3 milliamperes per square centimeter (mA/cm$^2$) until a battery voltage was about 4.2 volts (V). Subsequently, the battery was discharged with a constant current of about 0.3 mA/cm$^2$ until a battery voltage was about 2.8 V.

In the $2^{nd}$ cycle, each of the lithium batteries was charged with a constant current of about 0.5 mA/cm$^2$ until a battery voltage was about 4.2 V. Subsequently, the battery was discharged with a constant current of about 0.5 mA/cm$^2$ until a battery voltage was about 2.8 V.

In the $3^{rd}$ cycle, each of the lithium batteries was charged with a constant current of about 1.6 mA/cm$^2$ until a battery voltage was about 4.2 V. Subsequently, the battery was discharged with a constant current of about 1.6 mA/cm$^2$ until a battery voltage was about 2.8 V.

The three cycles were repeated so that the number of cycles was 250 in total.

The charge/discharge process was repeated until the charge/discharge process was repeated 250 times in total.

The coulombic efficiency was calculated using Equation 1, and the capacity retention was calculated using Equation 2.

Coulombic efficiency (%)=(discharge capacity in each cycle/charge capacity in each cycle)×100    Equation 1

Capacity retention (%)=(discharge capacity after each cycle/discharge capacity of $1^{st}$ cycle)×100    Equation 2

Figure 4A:
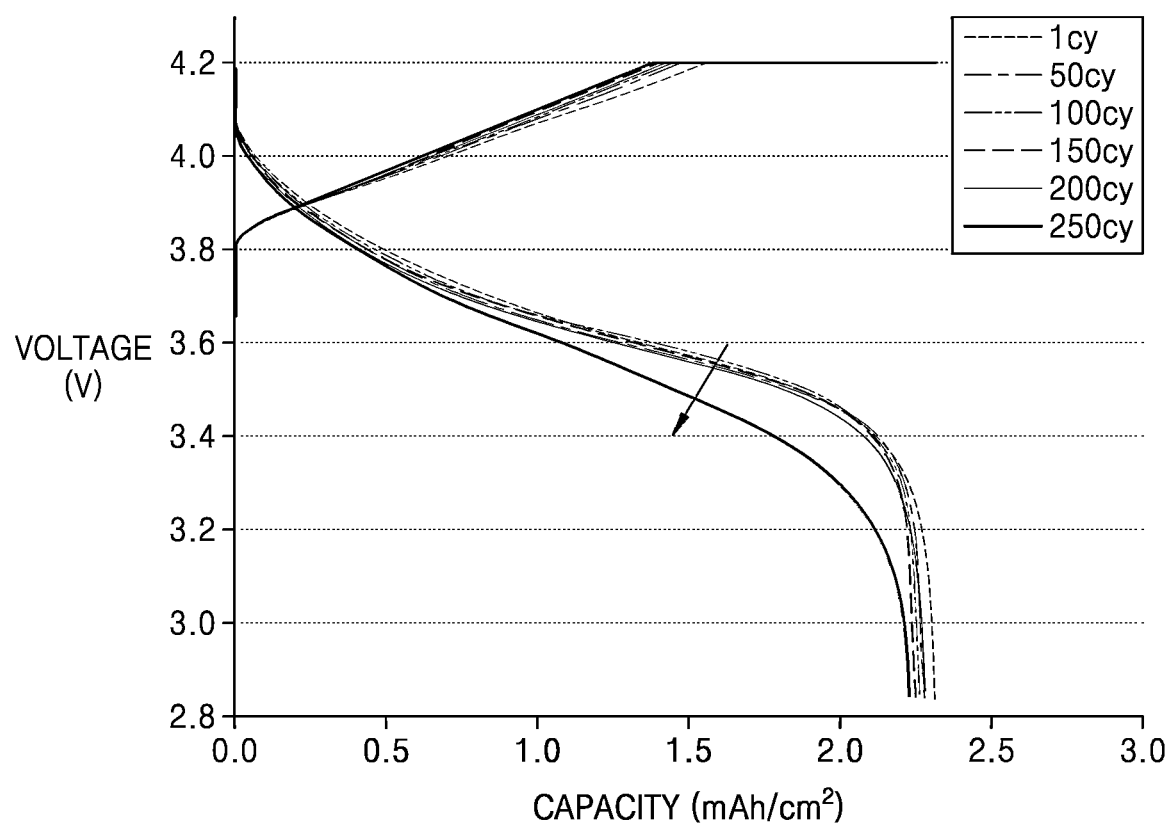
FIG. 4A is a graph of voltage (volts (V)) versus capacity (milliampere hours per square centimeter (mAh/cm$^2$)) showing voltage changes according to capacity of lithium batteries of Example 1.
Figure 4B:
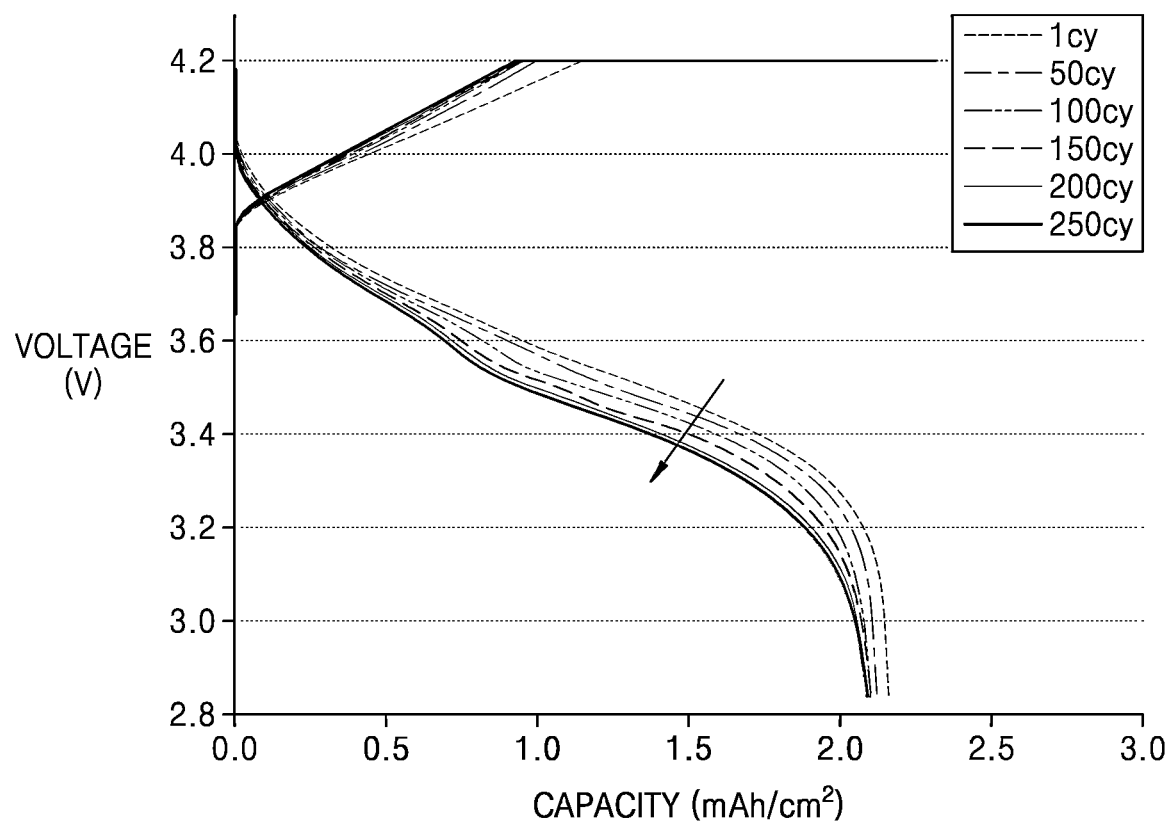
FIG. 4B is a graph of voltage (V) versus capacity (mAh/cm$^2$) showing voltage changes according to capacity of lithium batteries of Example 2.
Figure 4C:
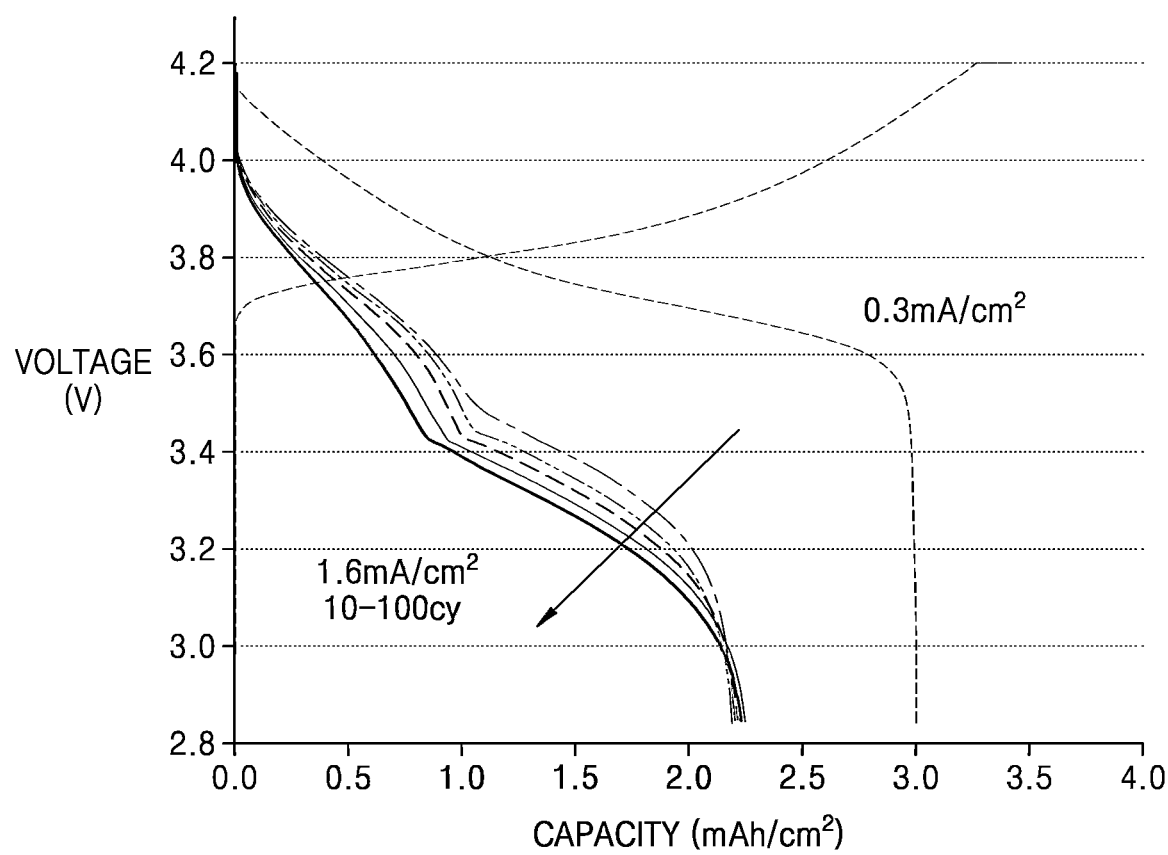
FIG. 4C is a graph of voltage (V) versus capacity (mAh/cm$^2$) showing voltage changes according to capacity of lithium batteries of Comparative Example 1.
Figure 5A:
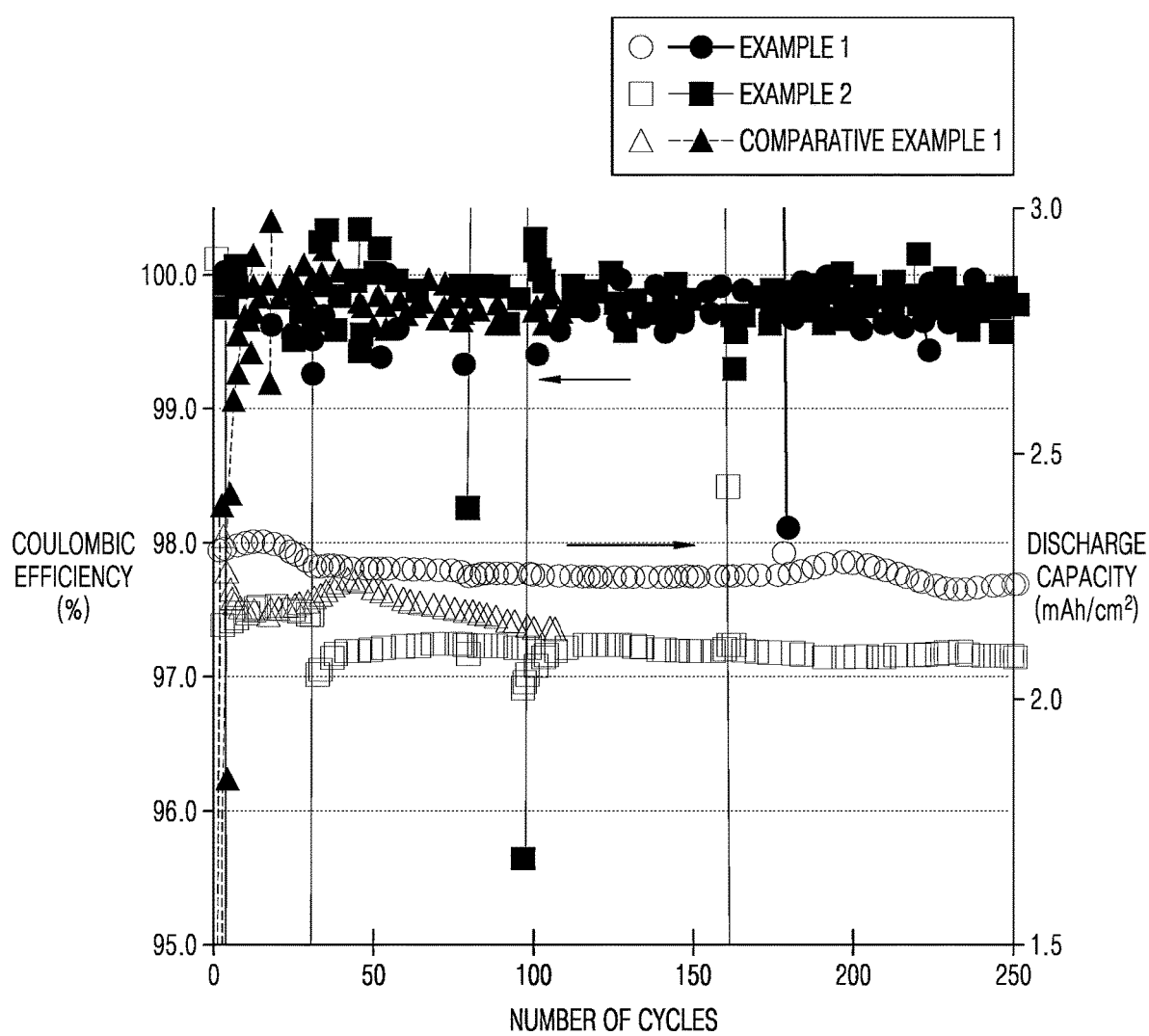
FIG. 5A is a graph of coulombic efficiency (percent (%), filled symbols) and discharge capacity (mAh/cm$^2$, open symbols) versus number of cycles showing changes in coulombic efficiency and discharge capacity of the lithium batteries of Examples 1 and 2 and Comparative Example 1.
Figure 5B:
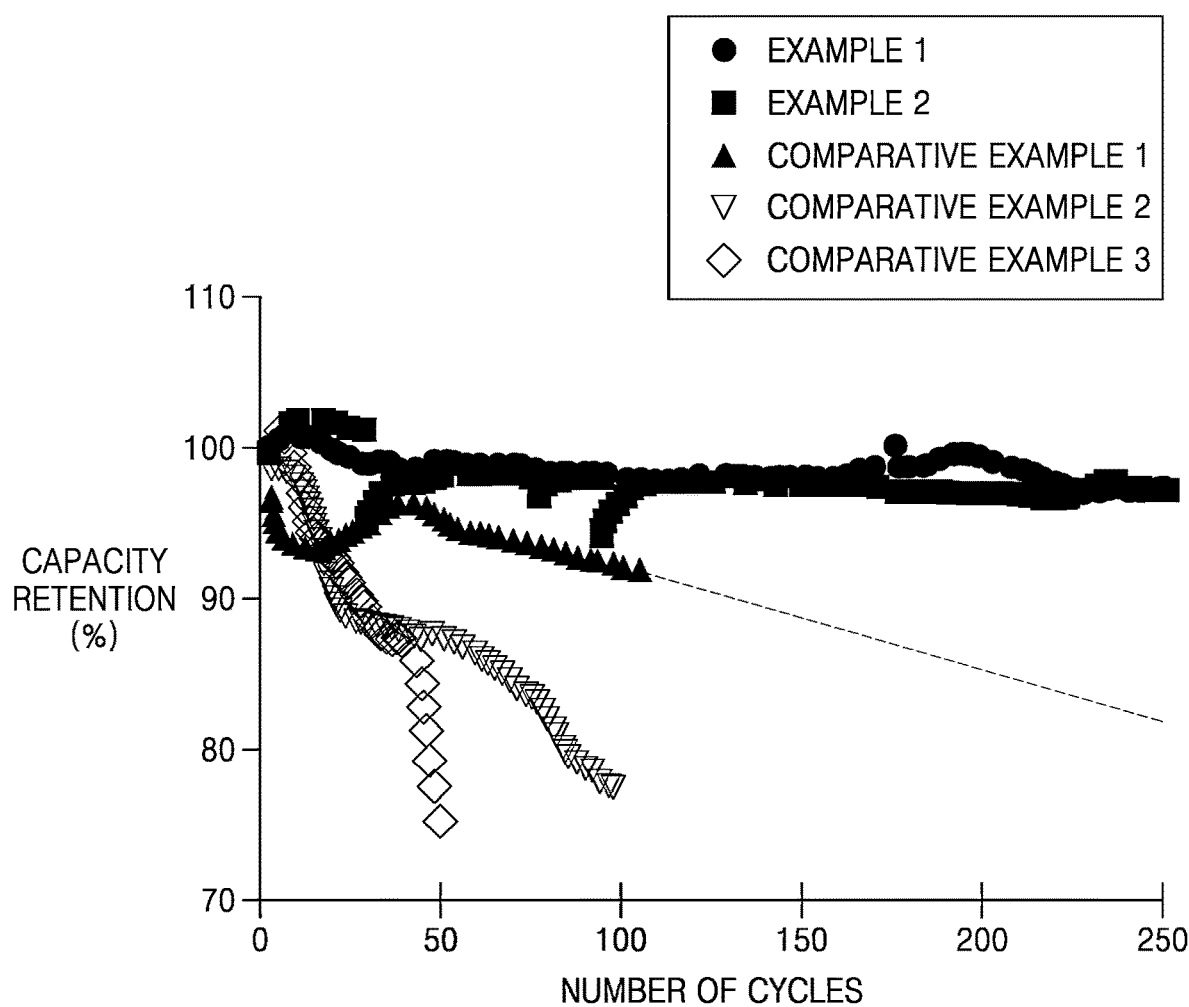
FIG. 5B is a graph of capacity retention (%) versus number of cycles showing changes in capacity retention of the lithium batteries of Examples 1 and 2 and Comparative Example 1 to 3.

Voltage changes according to capacity of the lithium batteries of Examples 1 and 2 and Comparative Example 1 were investigated and shown in FIG. 4A, FIG. 4B, and FIG. 4C, respectively. Changes in the Coulomb efficiency and discharge capacity of the lithium batteries of Examples 1 and 2 and Comparative Example 1 are shown in FIG. 5A, and the capacity retention are shown in Table 2. In FIG. 5A, the solid circle, square, and triangle graphs at the top of the figure correspond to Coulombic efficiencies, and the circle, square, and triangle graphs at the bottom of the figure correspond to areal capacity at 25° C. Capacity retention of the lithium batteries of Examples 1 and 2 and Comparative Examples 1 to 3 are shown in FIG. 5B.

TABLE 2

| Sample | Capacity retention (%) |
|---|---|
| Example 1 | 97.4 |
| Example 2 | 97.3 |
| Comparative Example 1 | 82 |
| Comparative Example 2 | 78.1 @98 cycles |
| Comparative Example 3 | 75.2 @49 cycles |

In Table 2, the capacity retention of the lithium batteries of Comparative Examples 2 and 2 were the results after $98^{th}$ cycle and $49^{th}$ cycle, respectively.

Referring to Table 2 and FIG. 5B, it may be determined that capacity retention of the lithium batteries of Examples 1 and 2 improved as compared with those of the lithium batteries of Comparative Examples 1 to 3. Referring to FIG. 5A, it may be confirmed that the Coulomb efficiency and a discharge capacity of the lithium batteries of Examples 1 and 2 were improved as compared with those of the lithium battery of Comparative Example 1.

Evaluation Example 5: X-Ray Diffraction (XRD) Analysis

X-ray diffraction (XRD) analysis of the silver-carbon composites prepared in Examples 3 to 5 were performed using Cu Kα radiation (wavelength (λ)=1.542 angstroms (Å)) at 25° C. The XRD analysis was performed using Bruker (D8 Advance).

Figure 7A:
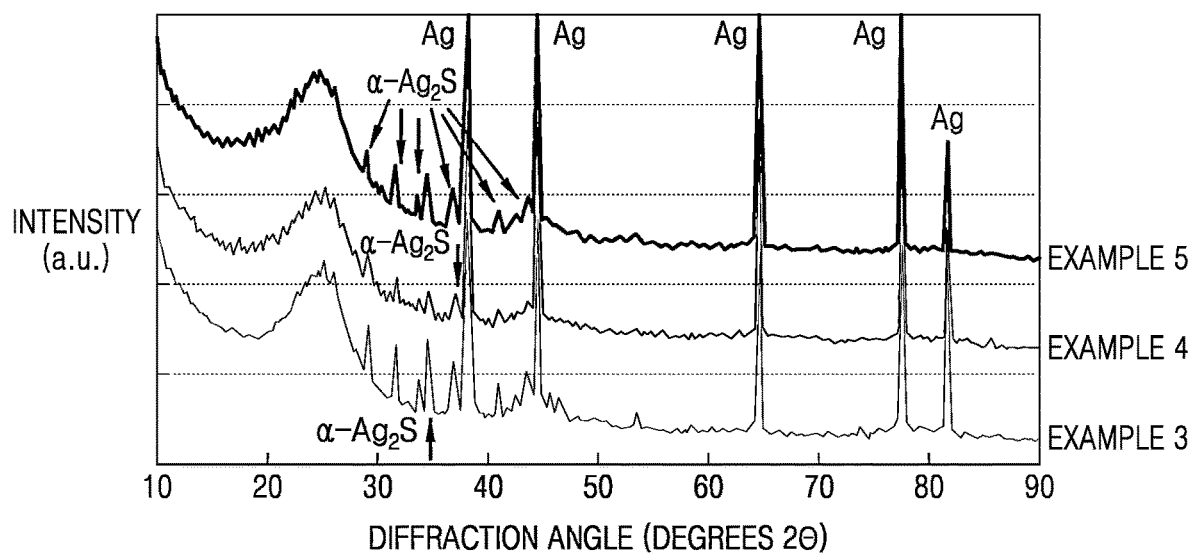
FIG. 7A is a graph of intensity (a.u.) versus diffraction angle (degrees 2θ) showing the results of X-ray diffraction (XRD) analysis of silver-carbon composites prepared in Examples 3 to 5.
Figure 7B:
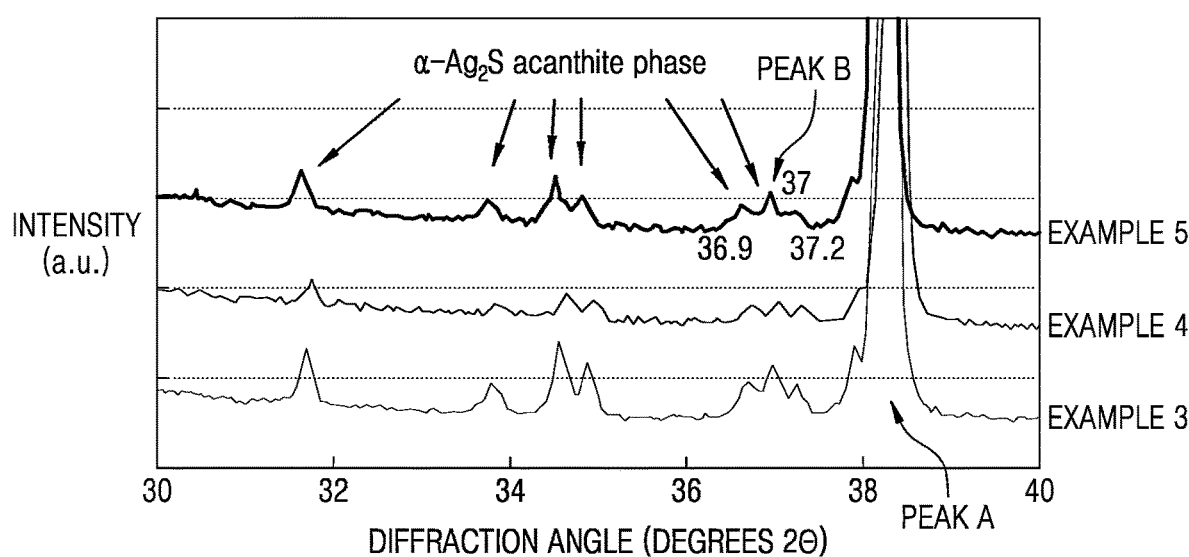
FIG. 7B is an enlarged view of a partial region of FIG. 7A.

The results of the XRD analysis are shown in FIG. 7A and FIG. 7B. FIG. 7A shows the results of XRD analysis of the silver-carbon composites prepared in Examples 3 to 5, and FIG. 7B is an enlarged view of a partial region of FIG. 7A.

Referring to FIG. 7A and FIG. 7B, in regard of peaks shown at which the diffraction angle 2θ is in a range of about 30° to about 38°, the silver-carbon composites of Examples 3 to 5 had an acanthite α-Ag2S structure.

In the XRD analysis of the silver-carbon composite according to an embodiment, a ratio (IB:IA) of an intensity (IB) of a peak B of beta-Ag$_2$S (at which the diffraction angle 2θ is in a range of about 36.9°2θ to about 37.2°2θ, particularly 37°2θ) to an intensity (IA) of a peak A related to an Ag(111) face, at which the diffraction angle 2θ is in a range of about 38°2θ to about 38.6°2θ, for example, about 38.2°2θ to about 38.3°2θ, is in a range of about 0.04:1 to about 0.05:1.

Figure 3A:
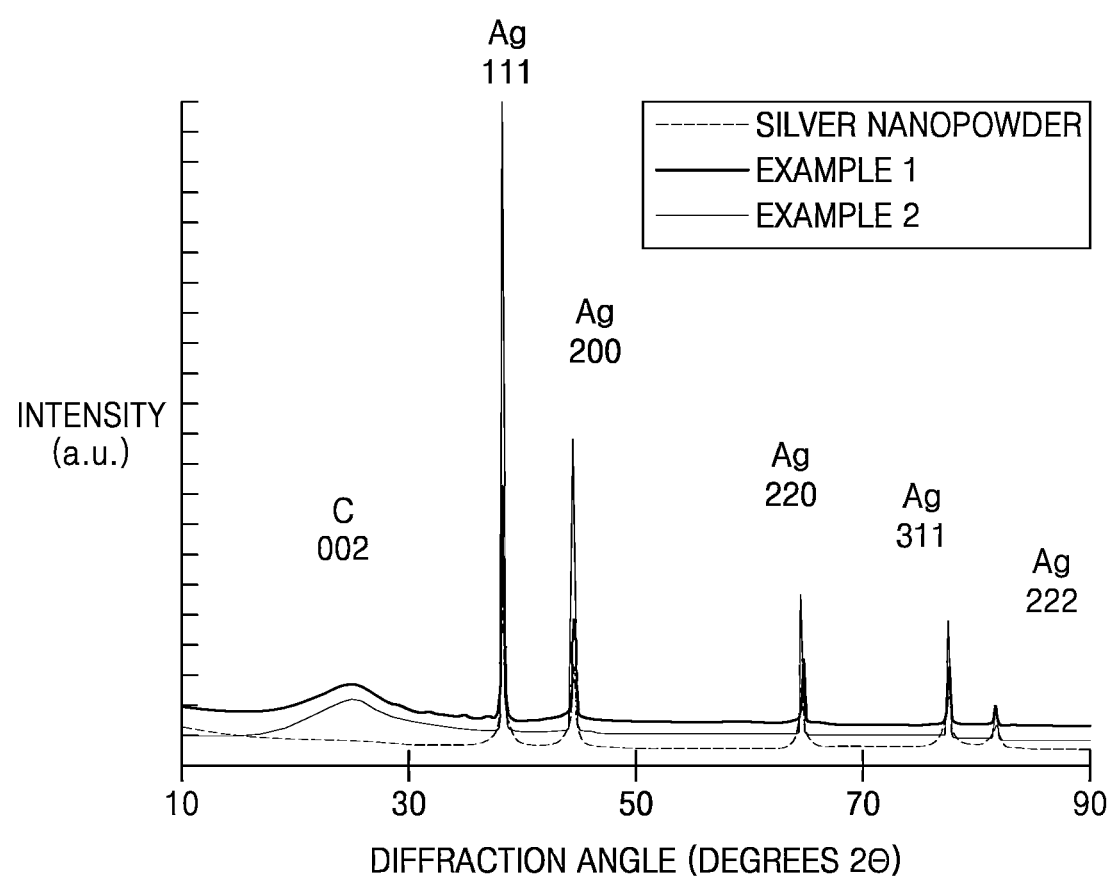
FIG. 3A is a graph of intensity (a.u.) versus diffraction angle (degrees 2θ) showing the results of X-ray diffraction ("XRD") analysis of the silver-carbon composites of Examples 1 and 2 and a silver nanopowder using Cu-Kα radiation.
Figure 3B:
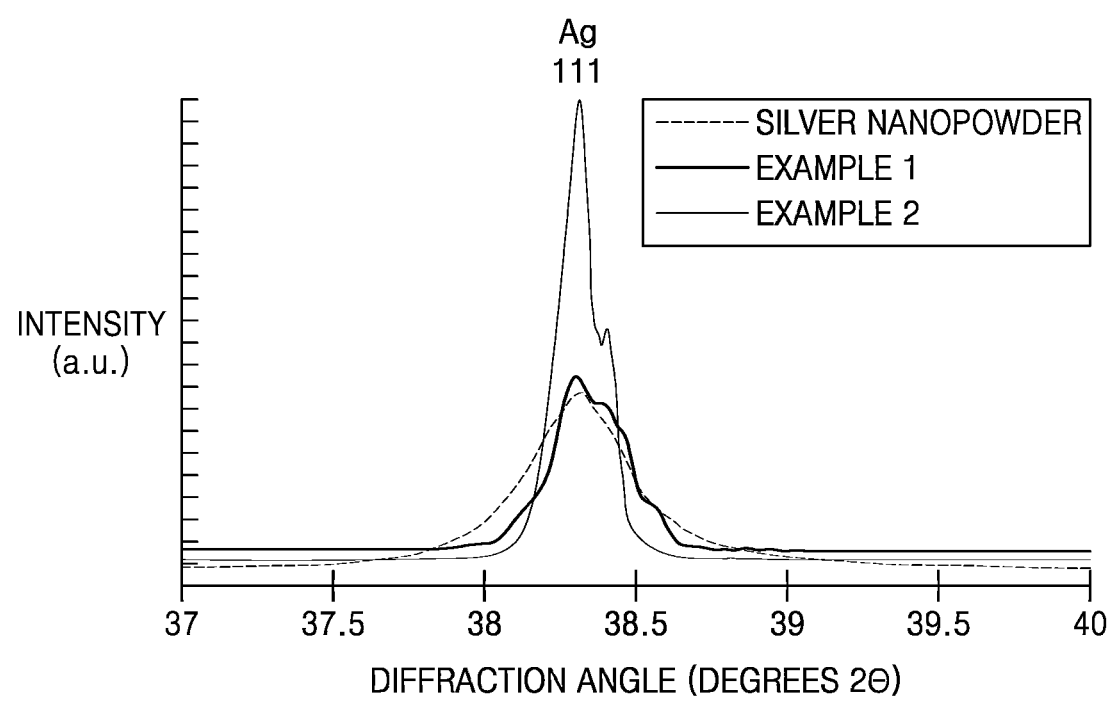
FIG. 3B is a graph of intensity (a.u.) versus diffraction angle (degrees 2θ) showing the results of XRD analysis of the silver-carbon composites of Examples 1 and 2 and a silver nanopowder using Cu-Kα radiation.

The XRD analysis was performed on the silver-carbon composites of Examples 1 and 2 and a silver nanopowder, and the results are shown in FIG. 3A and FIG. 3B.

FIG. 3A and FIG. 3B show the results of the XRD analysis of the silver-carbon composites and a silver nanopowder of Examples 1 and 2. In FIG. 3A and FIG. 3B, the silver nanopowder (having a particle diameter of about 26 nm) was shown for comparison with the results of the silver-carbon composites of Examples 1 and 2.

Referring to FIG. 3A and FIG. 3B, the peak A related to an Ag(111) face in the silver-carbon composites of Examples 1 and 2 appeared at which the diffraction angle was in a range of about 38°2θ to about 38.6°2θ, for example, about 38.2°2θ to about 38.3°2θ. Full width at half maximums ("FWHMs") of the peak A are shown in Table 3.

TABLE 3

| Sample | FWHM (°2θ) |
| --- | --- |
| Example 1 | 0.265 |
| Example 2 | 0.127 |
| Silver nanopowder | 0.371 |

Referring to Table 3, the FWHM of the peak A in the silver-carbon composites of Examples 1 and 2 had a value of about 0.3°2θ or less, whereas, unlike the silver-carbon composites of Examples 1 and 2, the FWHM of the peak A in the silver nanopowder had a value of greater than about 0.3°2θ.

Evaluation Example 6: Infrared Spectroscopy

Infrared spectra of the silver-carbon composites of Examples 1 and 2 and the silver-carbon composition of Comparative Example 1 were evaluated.

The silver-carbon composite of Example 1 included chemically bonded silver and silver sulfide, and the wavenumber of a carbon-carbon stretching band was different from the wavenumber of a carbon-carbon stretching band of the silver-carbon composition of Comparative Example 1. From this, it may be determined that a structure of the silver-carbon composite of Example 1 was distinguished from that of the silver-carbon composition of Comparative Example 1.

Evaluation Example 7: Inductively Coupled Plasma Atomic Emission Spectroscopy ("ICP-AES") Analysis ICP-AES analysis was performed on the silver-carbon composites prepared in Examples 1 to 5, and the results are shown in Table 4.

TABLE 4

| Sample | Amount of silver (wt %) |
| --- | --- |
| Example 1 | 24.6 |
| Example 2 | 24.8 |
| Example 3 | 24.5 |
| Example 4 | 24.1 |
| Example 5 | 24.6 |

From Table 4, amounts of silver in the silver-carbon composites of Examples 1 to 5 were confirmed.

While an embodiment has been described with reference to the figures, it will be understood by those of ordinary skill in the art that various changes in form and details may be made therein without departing from the spirit and scope as defined by the following claims.

A metal-carbon composite according to an embodiment has improved binding strength as a metal may be uniformly dispersed in a chemically bonded state on a surface of a carbonaceous material. When the metal-carbon composite is used, occurrence of short-circuit may be reduced, and a lithium battery having improved charge/discharge characteristics may be manufactured.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A lithium battery comprising:
a cathode, an anode, and a liquid-impermeable ion-conductive membrane between the cathode and the anode, and
an interlayer comprising a metal-carbon composite between the anode and the liquid-impermeable ion-conductive membrane, wherein the metal-carbon composite comprises:
a carbonaceous material,
a metal chemically bonded to the carbonaceous material, wherein the metal comprises silver, gold, platinum, palladium, silicon, aluminum, bismuth, zinc, gallium, indium, or a combination thereof, and
a metal sulfide, a metal fluoride, or a combination thereof, chemically bonded to the carbonaceous material, wherein the metal sulfide comprises a silver sulfide, a zinc sulfide, a platinum sulfide, a silicon sulfide, a bismuth sulfide, a gold sulfide, a gallium sulfide, an indium sulfide, an aluminum sulfide, or a combination thereof.

2. The lithium battery of claim 1,
wherein the metal comprises silver, gold, silicon, aluminum, bismuth, gallium, indium, or a combination thereof.

3. The lithium battery of claim 1,
wherein the metal sulfide comprises a silver sulfide, a silicon sulfide, a bismuth sulfide, a gold sulfide, a gallium sulfide, an indium sulfide, an aluminum sulfide, or a combination thereof, and
the metal fluoride comprises a silver fluoride, a tin fluoride, a zinc fluoride, a silicon fluoride, a bismuth fluoride, a gallium fluoride, an indium fluoride, an aluminum fluoride, or a combination thereof.

4. The lithium battery of claim 1,
wherein the metal-carbon composite is a silver-carbon composite comprising
silver chemically bonded to the carbonaceous material, and
a silver sulfide, a silver fluoride, or a combination thereof chemically bonded to the carbonaceous material.

5. The lithium battery of claim 4,
wherein the silver sulfide is an alpha-phase Ag2S.

6. The lithium battery of claim 4,
wherein, in an X-ray diffraction analysis of the silver-carbon composite, a ratio of an intensity of a peak of α-$Ag_2S$ to an intensity of a peak corresponding to an Ag(111) face is in a range of about 0.03:1 to about 0.06:1.

7. The lithium battery of claim 4,
wherein, in an X-ray diffraction analysis of the silver-carbon composite, a full width at half maximum of a diffraction angle 2θ of a peak corresponding to an Ag(111) face is in a range of about 0.1° to about 0.3°.

8. The lithium battery of claim 1,
wherein an amount of the metal in the metal-carbon composite is in a range of about 1 part to about 50 parts by weight, based on 100 parts by weight of the metal-carbon composite, and
an amount of the metal sulfide, the metal fluoride, or the combination thereof is in a range of about 0.01 parts to about 10 parts by weight, based on 100 parts by weight of the metal-carbon composite.

9. The lithium battery of claim 1,
wherein, when the metal-carbon composite is analyzed by X-ray photoelectron spectroscopy,
an atomic surface composition of fluorine is in a range of about 0.4 atomic percent to about 2 atomic percent, based on a total content of the surface of the metal-carbon composite, and
an atomic surface composition of sulfur is in a range of about 0.6 atomic percent to about 1.6 atomic percent, based on a total content of the surface of the metal-carbon composite.

10. The lithium battery of claim 1,
wherein a size of the metal in the metal-carbon composite is in a range of about 0.5 nanometers to about 300 nanometers, and
a size of the metal sulfide, the metal fluoride, or the combination thereof is in a range of about 0.1 nanometers to about 10 nanometers.

11. The lithium battery of claim 1,
wherein an amount of the metal-carbon composite in the interlayer is in a range of about 90 parts to about 99 parts by weight, based on 100 parts by weight of the interlayer.

12. The lithium battery of claim 1,
wherein the interlayer comprises a binder, and
wherein the binder comprises polyvinylidene fluoride, a polyvinyl alcohol copolymer, carboxymethyl cellulose, styrene-butadiene rubber, polytetrafluoroethylene, polyethylene, a vinylidene fluoride/hexafluoropropylene copolymer, polyacrylonitrile, polymethyl methacrylate, or a combination thereof.

13. The lithium battery of claim 1,
wherein the carbonaceous material comprises amorphous carbon, crystalline carbon, or a combination thereof,
wherein the amorphous carbon comprises carbon black, a vapor grown carbon fiber, acetylene black, activated furnace black, Ketjen black, a carbon nanofiber, or a combination thereof, and
wherein the crystalline carbon comprises natural graphite, artificial graphite, a carbon nanotube, graphene, or a combination thereof.

14. The lithium battery of claim 1,
wherein the anode comprises a lithium metal, a lithium alloy, or a combination thereof.

15. The lithium battery of claim 1,
wherein the anode comprises an anode current collector and a first anode active material layer, and
wherein the first anode active material layer comprises a carbonaceous anode active material, or
the first anode active material layer comprises a carbonaceous anode active material and a metal element, wherein the metal element comprises indium, silicon, gallium, tin, aluminum, titanium, zirconium, niobium, germanium, antimony, bismuth, gold, platinum, palladium, magnesium, palladium, silver, zinc, or a combination thereof.

16. The lithium battery of claim 1,
wherein the anode comprises an anode current collector and a first anode active material layer,
wherein a second anode active material layer is on the first anode active material layer and between the anode current collector and the first anode active material layer, and
wherein the second anode active material layer comprises lithium, a lithium alloy, or a combination thereof.

17. The lithium battery of claim 1,
wherein the liquid-impermeable ion-conductive membrane comprises a solid ionic conductor, a composite comprising a solid ionic conductor and a non-ionic conductor, or a combination thereof.

18. The lithium battery of claim 17, wherein the solid ionic conductor comprises $Li_{1+x}Ti_{2-x}Al(PO_4)_3$, wherein 0≤x≤4, a Li—Ge—P—S material, $Li_{1+x+y}Al_xTi_{2-x}Si_yP_{3-y}O_{12}$, wherein 0<x<2 and 0≤y<3, $BaTiO_3$, $Pb(Zr_aTi_{1-a})O_3$, wherein 0<a<1, $Pb_{1-x}La_xZr_{1-y}Ti_yO_3$, wherein 0≤x<1 and 0≤y<1, $Pb(Mg_{1/3}Nb_{2/3})O_3$—$PbTiO_3$, $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, SiC, $Li_3PO_4$, $Li_xTi_y(PO_4)_3$ wherein 0<x<2 and 0<y<3, $Li_xAl_yTi_z(PO_4)_3$ wherein 0<x<2, 0<y<1, and 0<z<3, $Li_{1+x+y}(Al_aGa_{1-a})_x(Ti_bGe_{1-b})_{2-x}Si_yP_{3-y}O_{12}$, wherein 0<a<1, 0<b<1, 0≤x≤1 and 0≤y≤1, $Li_xLa_yTiO_3$ wherein 0<x<2 and 0<y<3, $Li_xGe_yP_zS_w$ wherein 0<x<4, 0<y<1, 0<z<1, and 0<w<5, $Li_xN_y$, wherein 0<x<4 and 0<y<2, $Li_xSi_yS_z$ wherein 0<x<3, 0<y<2, and 0<z<4, $Li_xP_yS_z$ wherein 0<x<3, 0<y<3, and 0<z<7, $Li_2O$, LiF, LiOH, $Li_2CO_3$, $LiAlO_2$, a $Li_2O$—$Al_2O_3$—$SiO_2$—$P_2O_5$—$TiO_2$—$GeO_2$ ceramic, $Li_7La_3Zr_2O_{12}$, $Li_{3+x}La_3Zr_{2-a}M_aO_{12}$, wherein M is Ga, W, Nb, Ta, or Al, x is an integer of 1 to 10, and 0.05≤a≤0.7), $Li_{3+x}La_3M_2O_{12}$, wherein 0≤x≤5 and M is Te, Nb, or Zr, or a combination thereof.

19. The lithium battery of claim 1,
wherein a thickness of the interlayer is in a range of about 0.1 micrometers to about 50 micrometers.

20. The lithium battery of claim 1,
wherein the lithium battery is an all solid state battery.

21. A method of preparing a lithium battery of claim 1, the method comprising:
providing a composition for the interlayer comprising the metal-carbon composite, a binder, and a solvent;
coating the composition on a first surface of the liquid-impermeable ion-conductive membrane;
drying the composition to provide the interlayer;
arranging the anode on the interlayer; and
arranging the cathode on an opposite second surface of the liquid-impermeable ion-conductive membrane.

22. The method of claim 21, further comprising:
mixing a sulfur-containing metal precursor, a fluorine-containing metal precursor, or a combination thereof, a carbonaceous material, and a solvent to obtain a precursor mixture;
drying the precursor mixture to obtain a dried precursor mixture; and heat-treating the dried precursor mixture at a temperature of about 100° C. to about 900° C. to provide the metal-carbon composite for the composition.

23. The method of claim 22,
wherein the heat-treating of the dried precursor mixture comprises a first heat-treatment performed at a temperature of about 100° C. to about 400° C. and a second heat-treatment performed at a temperature in a range of about 350° C. to about 800° C.

24. The method of claim 21,
wherein the sulfur-containing metal precursor is silver methanesulfonate, silver ethanesulfonate, silver propanesulfonate, silver-2-propanesulfonate, silver butanesulfonate, silver 2-butanesulfonate, silver pentanesulfonate, silver 1-sulfonate, silver 2-hydroxypropane-1-sulfonate, silver 2-hydroxybutane-1-sulfonate, silver 2-hydroxypentanesulfonate, silver p-toluenesulfonate, silver p-phenolsulfonate, or a combination thereof, and
the sulfur- and fluorine-containing metal precursor is silver trifluoromethanesulfonate, silver bis(trifluoromethanesulfonyl)imide, silver bis(fluorosulfonyl)imide, silver fluorosulfonyl-(trifluoromethanesulfonyl) imide, or a combination thereof.

25. The method of claim 21,
wherein the carbonaceous material comprises amorphous carbon, crystalline carbon, or a combination thereof,
wherein the amorphous carbon comprises carbon black, a vapor grown carbon fiber, acetylene black, activated furnace black, Ketjen black, a carbon nanofiber, or a combination thereof, and the crystalline carbon comprises natural graphite, artificial graphite, a carbon nanotube, graphene, or a combination thereof.

26. A metal-carbon composite for use in an interlayer of a battery comprising:
a carbonaceous material having an average particle diameter of about 10 nanometers to about 900 nanometers, the metal comprising carbon black, a vapor grown carbon fiber, acetylene black, activated furnace black, Ketjen black, a carbon nanofiber, natural graphite, artificial graphite, a carbon nanotube, graphene, or a combination thereof;
a metal having a size of about 0.5 nanometers to about 300 nanometers chemically bonded to the carbonaceous material, the metal comprising silver, gold, platinum, palladium, silicon, aluminum, bismuth, zinc, gallium, indium, or a combination thereof; and
a metal sulfide, a metal fluoride, or a combination thereof having a size of about 0.1 nanometers to about 10 nanometers chemically bonded to the carbonaceous material, the metal sulfide, the metal fluoride, or the combination thereof comprising a silver sulfide, a zinc sulfide, a platinum sulfide, a silicon sulfide, a bismuth sulfide, a gold sulfide, a gallium sulfide, an indium sulfide, an aluminum sulfide, a silver fluoride, a zinc fluoride, a silicon fluoride, a bismuth fluoride, a gallium fluoride, an indium fluoride, an aluminum fluoride, or a combination thereof,
wherein a total amount of the metal and the metal sulfide, the metal fluoride, or the combination thereof is about 15 weight percent to about 40 weight percent, based on a total weight of the metal-carbon composite.

27. The lithium battery of claim 1, wherein
the metal fluoride is covalently bonded to the carbonaceous material, and the metal fluoride comprises a silver fluoride, a zinc fluoride, a silicon fluoride, a bismuth fluoride, a gallium fluoride, an indium fluoride, an aluminum fluoride, or a combination thereof.

28. A lithium battery comprising:
a cathode, an anode, and a liquid-impermeable ion-conductive membrane between the cathode and the anode, and
an interlayer comprising a silver-carbon composite between the anode and the liquid-impermeable ion-conductive membrane,
wherein the silver-carbon composite comprises silver chemically bonded to the carbonaceous material, and a silver sulfide, a silver fluoride, or a combination thereof chemically bonded to the carbonaceous material.

29. The lithium battery of claim 28,
wherein the silver sulfide in an alpha-phase $Ag_2S$ is chemically bonded to the carbonaceous material, and
in an X-ray diffraction analysis of the silver-carbon composite, a peak intensity ratio of a peak of $\alpha\text{-}Ag_2S$ to a peak of an Ag(111) face is in a range of about 0.03:1 to about 0.06:1.

* * * * *